(12) United States Patent
Yoshikawa et al.

(10) Patent No.: US 12,278,368 B2
(45) Date of Patent: Apr. 15, 2025

(54) POSITIVE ELECTRODE FOR NON-AQUEOUS ELECTROLYTE SECONDARY BATTERY, AND NON-AQUEOUS ELECTROLYTE SECONDARY BATTERY, BATTERY MODULE AND BATTERY SYSTEM USING THE SAME

(71) Applicant: SEKISUI CHEMICAL CO., LTD., Osaka (JP)

(72) Inventors: Hikaru Yoshikawa, Tsukuba (JP); Yuichi Sabi, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 387 days.

(21) Appl. No.: 17/768,975

(22) PCT Filed: Mar. 18, 2022

(86) PCT No.: PCT/JP2022/012907
§ 371 (c)(1),
(2) Date: Apr. 14, 2022

(87) PCT Pub. No.: WO2022/196831
PCT Pub. Date: Sep. 22, 2022

(65) Prior Publication Data
US 2023/0178731 A1    Jun. 8, 2023

(30) Foreign Application Priority Data

Mar. 19, 2021  (JP) .................................. 2021-045807
Aug. 18, 2021  (JP) .................................. 2021-133232

(51) Int. Cl.
*H01M 4/58*    (2010.01)
*H01M 4/36*    (2006.01)
(Continued)

(52) U.S. Cl.
CPC ......... *H01M 4/5825* (2013.01); *H01M 4/366* (2013.01); *H01M 4/625* (2013.01);
(Continued)

(58) Field of Classification Search
CPC .... H01M 4/5825; H01M 4/366; H01M 4/625; H01M 10/0525; H01M 10/0587;
(Continued)

(56) References Cited

U.S. PATENT DOCUMENTS 11,811,062 B2 * 11/2023 Yoshikawa ............. H01M 4/02
11,862,798 B2 *  1/2024 Yoshikawa ........... H01M 4/525
(Continued)

FOREIGN PATENT DOCUMENTS

CN    109742327    5/2019
CN    111342145    6/2020
(Continued)

OTHER PUBLICATIONS

Notice of reasons for rejection issued Mar. 1, 2022 in Japanese Application No. 2021-197118, with English translation.
(Continued)

*Primary Examiner* — Abdullah A Riyami
*Assistant Examiner* — Nader J Alhawamdeh
(74) *Attorney, Agent, or Firm* — Wenderoth, Lind & Ponack, L.L.P.

(57) ABSTRACT

A positive electrode is for a non-aqueous electrolyte secondary battery. The positive electrode includes: a current collector including a current collector main body formed of a metal material; and an active material layer on the current collector. The active material layer includes an active material which includes a compound having an olivine type crystal structure. A volume density of the active material layer is 2.2 g/cm³ to 2.7 g/cm³. The positive electrode suffers no damage when bent once in accordance with a 90° folding
(Continued)

endurance test method specified in Japanese Industrial Standards (JIS) P 8115 (2001).

13 Claims, 3 Drawing Sheets

(51) Int. Cl.
    *H01M 4/62*       (2006.01)
    *H01M 10/0525*    (2010.01)
    *H01M 10/0587*    (2010.01)
    *H01M 4/02*       (2006.01)

(52) U.S. Cl.
    CPC ... *H01M 10/0525* (2013.01); *H01M 10/0587* (2013.01); *H01M 2004/021* (2013.01); *H01M 2004/028* (2013.01)

(58) Field of Classification Search
    CPC ..... H01M 2004/021; H01M 2004/028; H01M 4/622; H01M 4/136; Y02E 60/10; Y02P 70/50
    See application file for complete search history.

(56) References Cited

U.S. PATENT DOCUMENTS

| | | | | |
|---|---|---|---|---|
| 2003/0134190 | A1* | 7/2003 | Ishida | H01M 50/581 |
| | | | | 429/162 |
| 2004/0041537 | A1* | 3/2004 | Ishida | H01M 10/052 |
| | | | | 320/107 |
| 2007/0259271 | A1* | 11/2007 | Nanno | H01M 6/42 |
| | | | | 429/318 |
| 2016/0126596 | A1* | 5/2016 | Heishi | H01M 50/562 |
| | | | | 29/623.2 |
| 2016/0293936 | A1* | 10/2016 | Takebayashi | H01M 4/5825 |
| 2018/0097225 | A1 | 4/2018 | Yamaya et al. | |
| 2019/0305362 | A1 | 10/2019 | Nozoe et al. | |
| 2020/0313233 | A1 | 10/2020 | Tomizawa et al. | |
| 2020/0395629 | A1* | 12/2020 | Hayashi | H01M 10/0585 |
| 2022/0352514 | A1* | 11/2022 | Yoshikawa | H01M 50/103 |
| 2022/0359873 | A1* | 11/2022 | Yoshikawa | H01M 4/02 |
| 2023/0115482 | A1* | 4/2023 | Yoshikawa | H01M 50/103 |
| | | | | 429/209 |
| 2023/0178731 | A1* | 6/2023 | Yoshikawa | H01M 4/136 |
| | | | | 429/209 |
| 2023/0207805 | A1* | 6/2023 | Yoshikawa | H01M 4/131 |
| | | | | 429/231.95 |

FOREIGN PATENT DOCUMENTS

| | | |
|---|---|---|
| EP | 3 379 616 | 9/2018 |
| JP | 2009-193805 | 8/2009 |
| JP | 2012-104290 | 5/2012 |
| JP | 2012-221855 | 11/2012 |
| JP | 2013-191297 | 9/2013 |
| JP | 2013-222664 | 10/2013 |
| JP | 2013-229187 | 11/2013 |
| JP | 2014-17199 | 1/2014 |
| JP | 2014-175238 | 9/2014 |
| JP | 2016-58374 | 4/2016 |
| JP | 2016-076493 | 5/2016 |
| JP | 2017-069108 | 4/2017 |
| JP | 2020-140827 | 9/2020 |
| WO | 2012/013685 | 2/2012 |
| WO | 2012/049778 | 4/2012 |
| WO | 2013/187522 | 12/2013 |
| WO | 2015/053277 | 4/2015 |

OTHER PUBLICATIONS

Notice of reasons for rejection issued Jun. 14, 2022 in Japanese Application No. 2021-197118, with English translation.
Notice of reasons for rejection issued Feb. 22, 2022 in Japanese Application No. 2021-197221, with English translation.
International Search Report issued Jun. 20, 2022 in International (PCT) Application No. PCT/JP2022/012907.
Notice of Allowance issued Jan. 4, 2023 in Japanese Patent Application No. 2021-197118, with English-language translation.

* cited by examiner

POSITIVE ELECTRODE FOR NON-AQUEOUS ELECTROLYTE SECONDARY BATTERY, AND NON-AQUEOUS ELECTROLYTE SECONDARY BATTERY, BATTERY MODULE AND BATTERY SYSTEM USING THE SAME

CROSS-REFERENCE TO RELATED APPLICATIONS

Priority is claimed from Japanese Patent Application No. 2021-045807 filed on Mar. 19, 2021, and Japanese Patent Application No. 2021-133232 filed on Aug. 18, 2021, the contents of which are incorporated herein by reference.

TECHNICAL FIELD

The present invention relates to a positive electrode for a non-aqueous electrolyte secondary battery, as well as a non-aqueous electrolyte secondary battery, a battery module, and a battery system, each using the positive electrode.

BACKGROUND ART

A non-aqueous electrolyte secondary battery is generally composed of a positive electrode, a non-aqueous electrolyte, a negative electrode, and a separation membrane (separator) installed between the positive electrode and the negative electrode.

A conventionally known positive electrode for a non-aqueous electrolyte secondary battery is formed by fixing a composition composed of a positive electrode active material containing lithium ions, a conducting agent, and a binder to the surface of a metal foil (current collector).

Examples of the practically used positive electrode active material containing lithium ions include lithium transition metal composite oxides such as lithium cobalt oxide ($LiCoO_2$), lithium nickel oxide ($LiNiO_2$), and lithium manganese oxide ($LiMn_2O_4$), and lithium phosphate compounds such as lithium iron phosphate ($LiFePO_4$).

Japanese Patent Application Unexamined Publication No. 2012-104290 discloses that the peel strength between the aluminum foil, which is a current collector, and the positive electrode mixture layer is improved when lithium phosphoric acid compound particles having an olivine structure in which the N-methylpyrrolidone (NMP) oil absorption amount is in a specific range are used as the positive electrode active material.

Japanese Patent Application Unexamined Publication No. 2014-175238 discloses the ratio (D/C) of the NMP oil absorption amount D with respect to the specific surface area C as an index of the surface affinity of the positive electrode active material with respect to the electrolytic solution containing the organic solvent.

The Examples of Japanese Patent Application Unexamined Publication No. 2014-17199 disclose the positive electrode in which the positive electrode active material layer is provided on the current collector. The positive electrode active material layer is composed of 100 parts by mass of the positive electrode active material which is lithium iron phosphate, 5 parts by mass of the conducting agent, 5 parts by mass of the binder, and 1 part by mass of the thickener. Japanese Patent Application Unexamined Publication No. 2014-17199 shows that the Examples, in which the surface of lithium iron phosphate is carbon-coated, improve cycling characteristics as compared with the Comparative Example in which the surface is not carbon-coated.

CITATION LIST

Patent Literature

[PTL 1]
 Japanese Patent Application Unexamined Publication No. 2012-104290
[PTL 2]
 Japanese Patent Application Unexamined Publication No. 2014-175238
[PTL 3]
 Japanese Patent Application Unexamined Publication No. 2014-17199

SUMMARY OF INVENTION

Technical Problem

For non-aqueous electrolyte secondary batteries, improvement of quick charging characteristics is required. That is, there is a demand for high input characteristics that can be input in a short time after discharging.

For addressing this issue, an object of the present invention is to provide a positive electrode for a non-aqueous electrolyte secondary battery, which is capable of improving input characteristics of the non-aqueous electrolyte secondary battery.

Further, the method described in Japanese Patent Application Unexamined Publication No. 2014-17199 is not necessarily satisfactory, and further improvement of battery performance is required.

For the non-aqueous electrolyte secondary battery, it is known that the cycling characteristics deteriorate by expansion and contraction of the positive electrode active material layer due to charging/discharging. For example, when the cycling characteristics are good even in a severely deformed state such that the electrode is bent with a small radius R, the degree of freedom in designing the electrode shape is increased, which is preferable in terms of improving the design.

For addressing this issue, an object of the present invention is to provide a positive electrode for a non-aqueous electrolyte secondary battery that can improve the volumetric energy density of the non-aqueous electrolyte secondary battery and realize excellent cycling characteristics in a bent state of the positive electrode.

Solution to Problem

The embodiments of the present invention are as follows.
[A1] A positive electrode for a non-aqueous electrolyte secondary battery, including a positive electrode current collector and a positive electrode active material layer which includes positive electrode active material particles, and is provided on the positive electrode current collector,
 wherein a dibutyl phthalate oil absorption amount of the positive electrode active material layer is 30.0 mL/100 g or more and less than 38.0 mL/100 g, preferably 31.0 to 37.0 mL/100 g, and more preferably 32.0 to 36.0 mL/100 g.
[A2] The positive electrode according to [A1], wherein the positive electrode active material layer includes a conducting agent, which is preferably at least one conducting agent selected from the group consisting of graphite, graphene, hard carbon, Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, relative to 100 parts by mass of a total mass of the positive electrode active material.

[A3] The positive electrode according to [A1] or [A2], wherein the positive electrode active material particles have, on at least a part of surfaces thereof, coated section including a conductive material, wherein an amount of the conductive material is preferably 0.1 to 4.0% by mass, more preferably 0.5 to 3.0% by mass, and even more preferably 0.7 to 2.5% by mass with respect to a total mass of the positive electrode active material including the coated section.

[A4] The positive electrode according to [A1], wherein the positive electrode active material layer does not contain a conducting agent, and the positive electrode active material particles have, on at least a part of surfaces thereof, coated section including a conductive material, wherein an amount of the conductive material is preferably 0.1 to 4.0% by mass, more preferably 0.5 to 3.0% by mass, and even more preferably 0.7 to 2.5% by mass with respect to a total mass of the positive electrode active material including the coated section.

[A5] The positive electrode according to any one of [A1] to [A4], wherein the positive electrode active material layer includes a conductive carbon, and an amount of the conductive carbon is 0.5% by mass or more and less than 3.0% by mass, preferably 1.0 to 2.8% by mass, and more preferably 1.2 to 2.6% by mass with respect to a total mass of the positive electrode active material layer.

[A6] The positive electrode according to any one of [A1] to [A5], wherein the positive electrode active material layer includes a binder, and an amount of the binder is 0.1 to 1.0% by mass, and preferably 0.3 to 0.8% by mass with respect to a total mass of the positive electrode active material layer.

[A7] The positive electrode according to any one of [A1] to [A6], wherein a volume density of the positive electrode active material layer is 2.20 to 2.70 g/cm$^3$, and preferably 2.25 to 2.50 g/cm'.

[A8] The positive electrode according to any one of [A1] to [A7], wherein the positive electrode active material particles include a compound represented by formula LiFe$_x$M$_{(1-x)}$PO$_4$, wherein 0≤x≤1 and M is Co, Ni, Mn, Al, Ti, or Zr, and the compound is preferably lithium iron phosphate represented by LiFePO$_4$.

[A9] The positive electrode according to any one of [A1] to [A8], wherein the positive electrode current collector has, on at least a part of its surface, a current collector coating layer including a conductive material on a side of the positive electrode active material layer, wherein the conductive material in the current collector coating layer preferably includes carbon, and the conductive material in the current collector coating layer more preferably consists exclusively of carbon, wherein a thickness of the current collector coating layer is preferably 0.1 to 4.0 μm.

[A10] A non-aqueous electrolyte secondary battery including the positive electrode according to any one of [A1] to [A9], a negative electrode, and a non-aqueous electrolyte provided between the positive electrode and the negative electrode.

[A11] A battery module or a battery system including a plurality of the non-aqueous electrolyte secondary batteries according to [A10].

[B1] A positive electrode for a non-aqueous electrolyte secondary battery, including: a positive electrode current collector including a positive electrode current collector main body formed of a metal material; and a positive electrode active material layer provided on the positive electrode current collector, wherein:
the positive electrode active material layer includes a positive electrode active material;
the positive electrode active material includes a compound having an olivine type crystal structure;
a volume density of the positive electrode active material layer is 2.2 to 2.7 g/cm$^3$, and preferably 2.3 to 2.6 g/cm$^3$; and
the positive electrode suffers no damage when bent once in accordance with a 90° folding endurance test method specified in JIS P 8115 (2001).

[B2] The positive electrode according to [B1], wherein one or both of the positive electrode current collector and the positive electrode active material layer includes a conductive carbon.

[B3] The positive electrode according to [B2], wherein an amount of the conductive carbon is 0.5 to 3.5% by mass, and preferably 1.5 to 3.0% by mass with respect to a mass of the positive electrode excluding the positive electrode current collector main body.

[B4] The positive electrode according to [B2] or [B3], wherein the positive electrode active material has, on at least a part of a surface thereof, a coated section which includes the conductive carbon and has a thickness of 1 to 100 nm, and an amount of the conductive carbon is preferably 0.1 to 3.0% by mass, more preferably 0.5 to 1.5% by mass, and more preferably 0.7 to 1.3% by mass with respect to the total mass of the positive electrode active material including the coated section.

[B5] The positive electrode according to any one of [B2] to [B4], wherein the positive electrode current collector main body has, on at least a part of its surface, an current collector coating layer which includes the conductive carbon and has a thickness of 0.1 to 4.0 μm.

[B6] The positive electrode according to any one of [B1] to [B5], wherein the positive electrode active material layer includes a conducting agent, which is preferably at least one conducting agent selected from the group consisting of graphite, graphene, hard carbon, Ketjen black, acetylene black, and carbon nanotube (CNT), wherein an amount of the conducting agent in the positive electrode active material layer is preferably 4 parts by mass or less, more preferably 3 parts by mass or less, and even more preferably 1 part by mass or less, relative to 100 parts by mass of a total mass of the positive electrode active material.

[B7] The positive electrode according to any one of [B1] to [B5], wherein the positive electrode active material layer does not contain a conducting agent.

[B8] The positive electrode according to any one of [B1] to [B7], wherein the positive electrode suffers no damage when bent 5 times in accordance with the 90° folding endurance test method.

[B9] The positive electrode according to any one of [B1] to [B8], which is produced by a roll-to-roll method.

[B10] A non-aqueous electrolyte secondary battery including the positive electrode according to any one of [B1] to [B9], a negative electrode, and a non-aqueous electrolyte provided between the positive electrode and the negative electrode.

[B11] The non-aqueous electrolyte secondary battery according to [B10], which includes a wound electrode assembly, wherein the positive electrode and the negative electrode are wound together with a separator provided therebetween.

[B-11-1] A method for producing the positive electrode according to any one of [B1] to [B8], which is processed by a roll-to-roll method.

[B12] A battery module or a battery system including a plurality of the non-aqueous electrolyte secondary batteries according to [B10] or [B11].

Advantageous Effects of Invention

The present invention can provide a positive electrode for a non-aqueous electrolyte secondary battery, which is capable of improving input characteristics of the non-aqueous electrolyte secondary battery.

Further, the present invention can provide a positive electrode for a non-aqueous electrolyte secondary battery that can improve the volumetric energy density of the non-aqueous electrolyte secondary battery and realize excellent cycling characteristics in a bent state of the positive electrode.

DESCRIPTION OF EMBODIMENTS

In the present specification and claims, "to" indicating a numerical range means that the numerical values described before and after "to" are included as the lower limit and the upper limit of the range.

Figure 1:
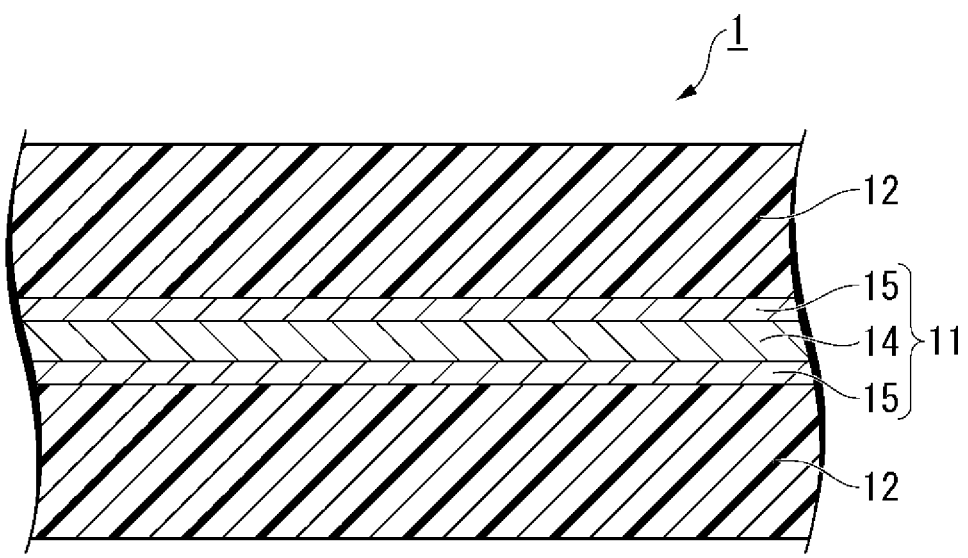
FIG. 1 is a cross-sectional view schematically showing an example of a positive electrode for a non-aqueous electrolyte secondary battery according to the present invention.
Figure 2:
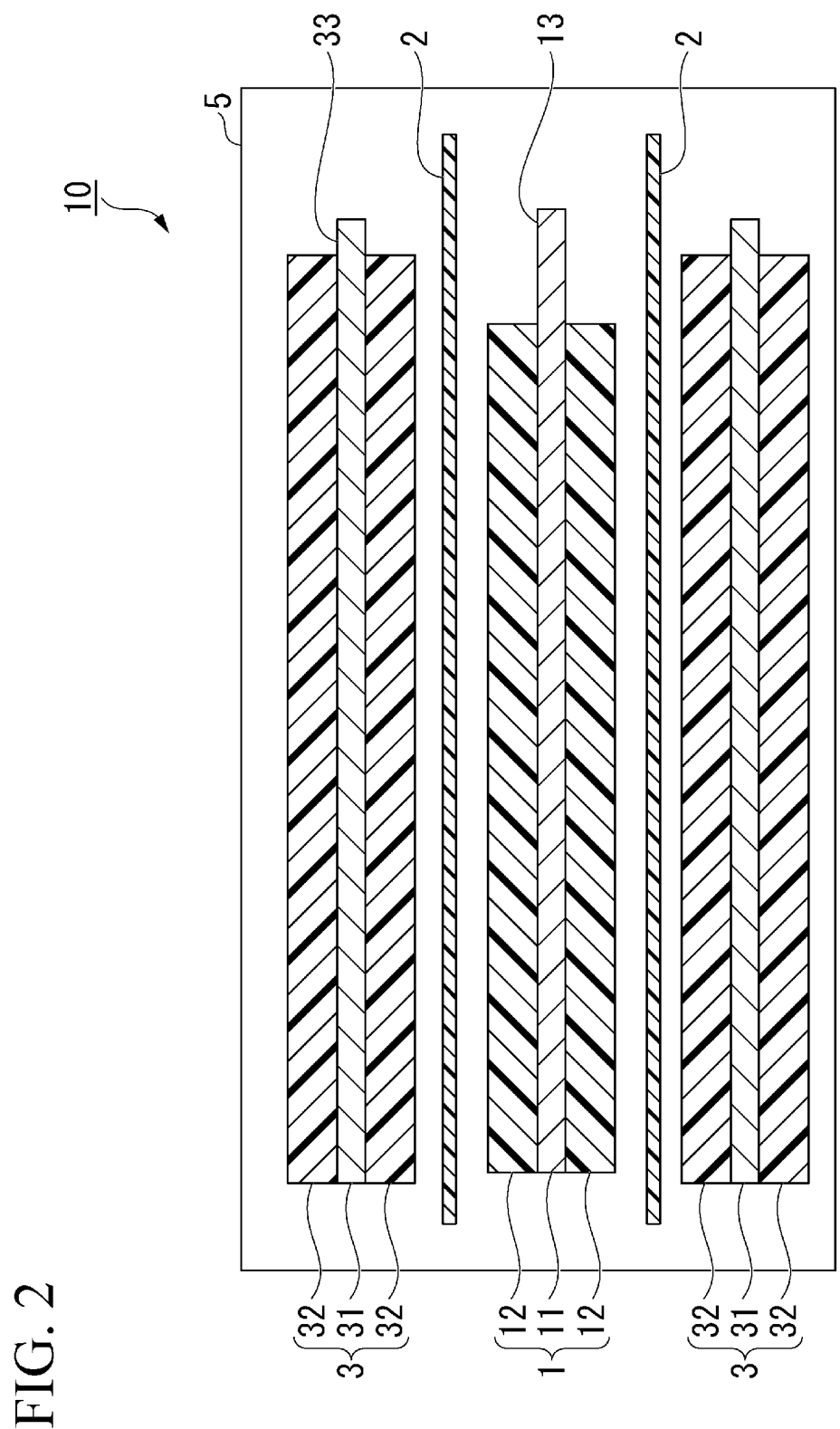
FIG. 2 is a cross-sectional view schematically showing an example of a non-aqueous electrolyte secondary battery according to the present invention.

FIG. 1 is a schematic cross-sectional view showing one embodiment of the positive electrode of the present invention for a non-aqueous electrolyte secondary battery, and FIG. 2 is a schematic cross-sectional view showing embodiment of the non-aqueous electrolyte secondary battery of the present invention.

FIG. 1 and FIG. 2 are schematic diagrams for facilitating the understanding of the configurations, and the dimensional ratios and the like of each component do not necessarily represent the actual ones.

<Positive Electrode for Non-Aqueous Electrolyte Secondary Battery>

In the present embodiment, the positive electrode for a non-aqueous electrolyte secondary battery (also simply referred to as "positive electrode") 1 has a positive electrode current collector 11 and a positive electrode active material layer 12.

The positive electrode active material layer 12 is present on at least one surface of the positive electrode current collector 11. The positive electrode active material layers 12 may be present on both sides of the positive electrode current collector 11.

In the example shown in FIG. 1, the positive electrode current collector 11 has current collector coating layers 15 on its surfaces facing the positive electrode active material layers 12. That is, the positive electrode current collector 11 has a positive electrode current collector main body 14 and current collector coating layers 15 that cover the positive electrode current collector main body 14 on its surfaces facing the positive electrode active material layers 12. The positive electrode current collector main body 14 alone may be used as the positive electrode current collector 11.

First Embodiment

In the first embodiment of the present invention, the positive electrode 1 for a non-aqueous electrolyte secondary battery, includes a positive electrode current collector 11 and a positive electrode active material layer 12 which includes positive electrode active material particles, and is provided on the positive electrode current collector 11, wherein a dibutyl phthalate oil absorption amount of the positive electrode active material layer 12 is 30.0 mL/100 g or more and less than 38.0 mL/100 g.

The positive electrode 1 having the above configuration can improve the input characteristics of the non-aqueous electrolyte secondary battery.

More specific explanation is made below.

(Positive Electrode Active Material Layer)

The positive electrode active material layer 12 includes positive electrode active material particles.

The positive electrode active material layer 12 preferably further includes a binder.

The positive electrode active material layer 12 may further include a conducting agent. In the context of the present specification, the term "conducting agent" refers to a conductive material of a particulate shape, a fibrous shape, etc., which is mixed with the positive electrode active material particles for the preparation of the positive electrode active material layer or formed in the positive electrode active material layer, and is caused to be present in the positive electrode active material layer in a form connecting the positive electrode active material particles.

The positive electrode active material layer 12 may further include a dispersant.

The amount of the positive electrode active material particles is preferably 80.0 to 99.9% by mass, and more preferably 90 to 99.5% by mass, based on the total mass of the positive electrode active material layer 12 (including the mass of the coated section of the active material described later if present).

The thickness of the positive electrode active material layer (total thickness of the positive electrode active material layers in the case where the positive electrode active material layers are formed on both sides of the positive electrode current collector) is preferably 30 to 500 μm, more preferably 40 to 400 μm, particularly preferably 50 to 300 μm. When the thickness of the positive electrode active material layer is not less than the lower limit value of the above range, the energy density of a battery with the positive electrode incorporated therein tends to improve. When the thickness is not more than the upper limit value of the above range, the peel strength of the positive electrode active material layer can be improved, thereby preventing delamination of the positive electrode active material layer during charging/discharging.

(Positive Electrode Active Material Particles)

The positive electrode active material particles preferably have, on at least a part of its surface, a coated section of active material including a conductive material (hereinbelow, the positive electrode active material particles having such a coated section of the active material are also referred to as "coated particles"). It is more preferable that the entire surfaces of the positive electrode active material particles are coated with a conductive material for achieving more excellent battery capacity and cycling performance.

In this context, the expression "at least a part of its surface" means that the coated section of the active material covers 50% or more, preferably 70% or more, more preferably 90% or more, particularly preferably 100% of the total area of the entire outer surfaces of the positive electrode active material particles. This ratio (%) of the coated section (hereinafter, also referred to as "coverage") is an average value for all the positive electrode active material particles present in the positive electrode active material layer. As long as this average value is not less than the above lower limit value, the positive electrode active material layer may contain a small amount of positive electrode active material particles without the coated section. When the positive electrode active material particles without the coated section are present in the positive electrode active material layer, the amount thereof is preferably 30% by mass or less, more preferably 20% by mass or less, and particularly preferably 10% by mass or less, with respect to the total mass of the positive electrode active material particles present in the positive electrode active material layer.

The coverage can be measured by a method as follows. First, the particles in the positive electrode active material layer are analyzed by the energy dispersive X-ray spectroscopy (TEM-EDX) using a transmission electron microscope. Specifically, an elemental analysis is performed by EDX with respect to the outer peripheral portion of the positive electrode active material particles in a TEM image. The elemental analysis is performed on carbon to identify the carbon covering the positive electrode active material particles. A section with a carbon coating having a thickness of 1 nm or more is defined as a coated section, and the ratio of the coated section to the entire circumference of the observed positive electrode active material particle can be determined as the coverage. The measurement can be performed with respect to, for example, 10 positive electrode active material particles, and an average value thereof can be used as a value of the coverage.

Further, the coated section of the active material is a layer directly formed on the surface of particles (core section) composed of only the positive electrode active material, which has a thickness of 1 nm to 100 nm, preferably 5 nm to 50 nm. This thickness can be determined by the above-mentioned TEM-EDX used for the measurement of the coating ratio.

The conductive material of the coated section of the active material preferably contains carbon (conductive carbon). The conductive material may be composed only of carbon, or may be a conductive organic compound containing carbon and elements other than carbon. Examples of the other elements include nitrogen, hydrogen, oxygen and the like. In the conductive organic compound, the amount of the other elements is preferably 10 atomic % or less, and more preferably 5 atomic % or less.

It is more preferable that the conductive material in the coated section of the active material is composed only of carbon.

The amount of the conductive material is 0.1 to 4.0% by mass, more preferably 0.5 to 3.0% by mass, and even more preferably 0.7 to 2.5% by mass, based on the total mass of the positive electrode active material particles including the coated section of the active material. It is preferable that the amount of the conductive material is not more than the upper limit of the above range since the conductive material is less likely to peel off from the surface of the positive electrode active material particles, and the conductive material is less likely to remain as independent conducting agent particles.

For example, the coated section of the active material is formed in advance on the surface of the positive electrode active material particles, and is present on the surface of the positive electrode active material particles in the positive electrode active material layer. That is, the coated section of the active material in the present embodiment is not one newly formed in the steps following the preparation step of a positive electrode composition. In addition, the coated section of the active material is not one that comes off in the steps following the preparation step of a positive electrode composition.

For example, the coated section stays on the surface of the positive electrode active material even when the coated particles are mixed with a solvent by a mixer or the like during the preparation of a positive electrode composition. Further, the coated section stays on the surface of the positive electrode active material even when the positive electrode active material layer is detached from the positive electrode and then put into a solvent to dissolve the binder contained in the positive electrode active material layer in the solvent. Furthermore, the coated section stays on the surface of the positive electrode active material even when an operation to disintegrate agglomerated particles is implemented for measuring the particle size distribution of the particles in the positive electrode active material layer by the laser diffraction scattering method.

Examples of the method for producing the coated particles include a sintering method and a vapor deposition method. Examples of the sintering method include a method that sinters an active material composition (for example, a slurry) containing the positive electrode active material particles and an organic substance at 500 to 1000° C. for 1 to 100 hours under atmospheric pressure. Examples of the organic substance added to the active material composition include salicylic acid, catechol, hydroquinone, resorcinol, pyrogallol, fluoroglucinol, hexahydroxybenzene, benzoic acid, phthalic acid, terephthalic acid, phenylalanine, water dispersible phenolic resins, saccharides (e.g., sucrose, glucose and lactose), carboxylic acids (e.g., malic acid and citric acid), unsaturated monohydric alcohols (e.g., allyl alcohol and propargyl alcohol), ascorbic acid, and polyvinyl alcohol. This sintering method sinters an active material composition to allow carbon in the organic material to be fused to the surface of the positive electrode active material to thereby form the coated section of the active material.

Another example of the sintering method is the so-called impact sintering coating method.

The impact sintering coating method is, for example, carried out as follows. In an impact sintering coating device, a burner is ignited using a mixed gas of a hydrocarbon and oxygen as a fuel to burn the mixed gas in a combustion chamber, thereby generating a flame, wherein the amount of oxygen is adjusted so as not to exceed its equivalent amount that allows complete combustion of the fuel, to thereby lower the flame temperature. A powder supply nozzle is installed downstream thereof, from which a solid-liquid-gas three-phase mixture containing a combustion gas as well as a slurry formed by dissolving an organic substance for coating in a solvent is injected toward the flame. The injected fine powder is accelerated at a temperature not higher than the transformation temperature, the sublimation temperature, and the evaporation temperature of the powder material by increasing the amount of combustion gas maintained at room temperature to lower the temperature of the injected fine powder. This allows the particles of the powder to be instantly fused on the active material by impact, thereby forming coated particles of the positive electrode active material.

Examples of the vapor deposition method include a vapor phase deposition method such as a physical vapor deposition method (PVD) and a chemical vapor deposition method (CVD), and a liquid phase deposition method such as plating.

The positive electrode active material particles preferably contain a compound having an olivine crystal structure.

The compound having an olivine crystal structure is preferably a compound represented by the following formula: $LiFe_xM_{(1-x)}PO_4$ (hereinafter, also referred to as "formula (I)"). In the formula (I), $0 \leq x \leq 1$. M is Co, Ni, Mn, Al, Ti or Zr. A minute amount of Fe and M (Co, Ni, Mn, Al, Ti or Zr) may be replaced with another element so long as the replacement does not affect the physical properties of the compound. The presence of a trace amount of metal impurities in the compound represented by the formula (I) does not impair the effect of the present invention.

The compound represented by the formula (I) is preferably lithium iron phosphate represented by $LiFePO_4$ (hereinafter, also simply referred to as "lithium iron phosphate"). The positive electrode active material particles are more preferably lithium iron phosphate particles having, on at least a part of their surfaces, a coated section including a conductive material (hereinafter, also referred to as "coated lithium iron phosphate particles"). It is more preferable that the entire surfaces of lithium iron phosphate particles are coated with a conductive material for achieving more excellent battery capacity and cycling performance.

The coated lithium iron phosphate particles can be produced by a known method.

For example, the coated lithium iron phosphate particles can be obtained by a method in which a lithium iron phosphate powder is prepared by following the procedure described in Japanese Patent No. 5098146, and at least a part of the surface of lithium iron phosphate particles in the powder is coated with carbon by following the procedure described in GS Yuasa Technical Report, June 2008, Vol. 5, No. 1, pp. 27-31 and the like.

Specifically, first, iron oxalate dihydrate, ammonium dihydrogen phosphate, and lithium carbonate are weighed to give a specific molar ratio, and these are pulverized and mixed in an inert atmosphere. Next, the obtained mixture is heat-treated in a nitrogen atmosphere to prepare a lithium iron phosphate powder. Then, the lithium iron phosphate powder is placed in a rotary kiln and heat-treated while supplying methanol vapor with nitrogen as a carrier gas to obtain a powder of lithium iron phosphate particles having at least a part of their surfaces coated with carbon.

For example, the particle size of the lithium iron phosphate powder can be adjusted by optimizing the crushing time in the crushing process. The amount of carbon coating the particles of the lithium iron phosphate powder can be adjusted by optimizing the heating time and temperature in the step of implementing heat treatment while supplying methanol vapor. It is desirable to remove the carbon particles not consumed for coating by subsequent steps such as classification and washing.

The positive electrode active material particles may contain one or more positive electrode active material particles containing other positive electrode active materials than the compound having an olivine type crystal structure.

Preferable examples of the other positive electrode active materials include a lithium transition metal composite oxide. Specific examples thereof include lithium cobalt oxide ($LiCoO_2$), lithium nickel oxide ($LiNiO_2$), lithium nickel cobalt aluminum oxide ($LiNi_xCo_yAl_zO_2$ with the proviso that $x+y+z=1$), lithium nickel cobalt manganese oxide ($LiNi_xCo_yMn_zO_2$ with the proviso that $x+y+z=1$), lithium manganese oxide ($LiMn_2O_4$), lithium manganese cobalt oxide ($LiMnCoO_4$), lithium manganese chromium oxide ($LiMnCrO_4$), lithium vanadium nickel oxide ($LiNiVO_4$), nickel-substituted lithium manganese oxide (e.g., $LiMn_{1.5}Ni_{0.5}O_4$), and lithium vanadium cobalt oxide ($LiCoVO_4$), as well as nonstoichiometric compounds formed by partially substituting the compounds listed above with metal elements. Examples of the metal element include one or more selected from the group consisting of Mn, Mg, Ni, Co, Cu, Zn and Ge.

With respect to the other positive electrode active material particles, a single type thereof may be used individually or two or more types thereof may be used in combination.

The other positive electrode active material particles may have, on at least a part of its surface, the coated section described above.

The amount of the compound having an olivine type crystal structure is preferably 50% by mass or more, preferably 80% by mass or more, and even more preferably 90% by mass or more, based on the total mass of the positive electrode active material particles (including the coated section of the active material if present). This amount may be 100% by mass.

When the coated lithium iron phosphate particles are used, the amount of the coated lithium iron phosphate particles is preferably 50% by mass or more, more preferably 80% by mass or more, and even more preferably 90% by mass or more, based on the total mass of the positive electrode active material (including the mass of the coated section of the active material if present). This amount may be 100% by mass.

The thickness of the coated section of the active material of the positive electrode active material particles is preferably 1 to 100 nm, more preferably 3 to 50 nm, and even more preferably 5 to 25 nm.

The thickness of the coated section of the active material of the positive electrode active material particles can be measured by a method of measuring the thickness of the coated section in a transmission electron microscope (TEM) image of the positive electrode active material particles. The thickness of the coated section of the active material on the surface of the positive electrode active material particles need not be uniform. It is preferable that the positive electrode active material particles have, on at least a part of its surface, the coated section of the active material having a thickness of 1 nm or more, and the maximum thickness of the coated section of the active material is 100 nm or less.

The average particle size of the positive electrode active material particles (including the thickness of the coating section of the active material if present) is, for example, preferably 0.1 to 20.0 μm, more preferably 0.5 to 15.0 μm. When two or more types of positive electrode active material particles are used, the average particle size of each of such positive electrode active material particles may be within the above range.

When the average particle size is not less than the lower limit of the above range, the specific surface area (unit: $m^2/g$) becomes moderately small, and the oil absorption amount of the positive electrode active material layer tends to be small. As a result, the dispersibility in the positive electrode composition tends to be improved, and aggregates tend to be less likely to be generated. On the other hand, when the average particle size is not more than the upper limit of the above range, the specific surface area becomes moderately large, and it is easy to secure an area for reacting by charging and discharging. As a result, the resistance of the battery becomes low, and the input and output characteristics are less likely to be lowered.

The average particle size of the positive electrode active material particles in the present specification is a volume-based median particle size measured using a laser diffraction/scattering particle size distribution analyzer.

(Binder)

The binder that can be contained in the positive electrode active material layer 12 is an organic substance, and examples thereof include polyacrylic acid, lithium polyacrylate, polyvinylidene fluoride, polyvinylidene fluoride-hexafluoropropylene copolymers, styrene butadiene rubbers, polyvinyl alcohol, polyvinyl acetal, polyethylene oxide, polyethylene glycol, carboxymethyl cellulose, polyacrylic nitrile, and polyimide. With respect to the binder, a single type thereof may be used alone or two or more types thereof may be used in combination.

When the positive electrode active material layer 12 contains a binder, the smaller the amount of the binder in the positive electrode active material layer 12, the smaller the oil absorption amount of the positive electrode active material layer 12. The amount of the binder is preferably 1.0% by mass or less, more preferably 0.8% by mass or less, based on the total mass of the positive electrode active material layer 12.

When the positive electrode active material layer 12 contains a binder, the lower limit of the amount of the binder is preferably 0.1% by mass or more, and more preferably 0.3% by mass or more, based on the total mass of the positive electrode active material layer 12.

That is, when the positive electrode active material layer 12 contains a binder, the amount of the binder is preferably 0.1% by mass to 1.0% by mass, and more preferably 0.3 to 0.8% by mass, based on a total mass of the positive electrode active material layer 12.

(Conducting Agent)

Examples of the conducting agent contained in the positive electrode active material layer 12 include carbon materials such as carbon black (e.g., Ketjen black, and acetylene black), graphite, graphene, hard carbon, and carbon nanotube (CNT). With respect to the conducting agent, a single type thereof may be used alone or two or more types thereof may be used in combination.

The amount of the conducting agent in the positive electrode active material layer 12 is, for example, preferably 4 parts by mass or less, more preferably 3 parts by mass or less, and even more preferably 1 part by mass or less, relative to 100 parts by mass of the total mass of positive electrode active material. It is particularly preferable that the positive electrode active material layer 12 does not contain a conducting agent, and it is desirable that there are no independent conducting agent particles (for example, independent carbon particles).

The "conducting agent" is a conductive material independent of the positive electrode active material, and may include a conductive material having a fibrous form (for example, carbon nanotube) as well as isolated conducting agent particles.

The conducting agent in contact with the positive electrode active material particles in the positive electrode active material layer is not regarded as the conductive material constituting the coated section of the positive electrode active material.

When the conducting agent is incorporated into the positive electrode active material layer 12, the lower limit value of the amount of the conducting agent is appropriately determined according to the type of the conducting agent, and is, for example, more than 0.1% by mass, based on the total mass of the positive electrode active material layer 12.

That is, when the positive electrode active material layer 12 contains the conducing agent, the amount of the conducing agent is preferably 0.2 to 4 parts by mass, more preferably 0.3 to 3 parts by mass, and even more preferably 0.5 to 1 parts by mass, relative to 100 parts by mass of the total mass of positive electrode active material.

In the context of the present specification, the expression "the positive electrode active material layer 12 does not contain a conducting agent" or similar expression means that the positive electrode active material layer 12 does not substantially contain a conducting agent, and should not be construed as excluding a case where a conducting agent is contained in such an amount that the effects of the present invention are not affected. For example, if the amount of the conducting agent is 0.1% by mass or less, based on the total mass of the positive electrode active material layer 12, then, it is judged that substantially no conducting agent is contained.

(Dispersant)

The dispersant contained in the positive electrode active material layer 12 is an organic substance, and examples thereof include polyvinylpyrrolidone (PVP), polyvinyl alcohol (PVA), polyvinyl butyral (PVB), and polyvinylformal (PVF). With respect to these dispersants, a single type thereof may be used individually or two or more types thereof may be used in combination.

The dispersant contributes to the reduction of the oil absorption amount of the positive electrode active material layer. On the other hand, when the amount of the dispersant is too large, the resistance increases and the input characteristics are likely to be lowered.

The amount of the dispersant is preferably 0.5% by mass or less, and more preferably 0.2% by mass or less, based on the total mass of the positive electrode active material layer 12.

When the positive electrode active material layer 12 contains a dispersant, the lower limit of the amount of the dispersant is preferably 0.01% by mass or more, and more preferably 0.05% by mass or more, based on the total mass of the positive electrode active material layer 12.

That is, when the positive electrode active material layer 12 contains a dispersant, the amount of the dispersant is preferably 0.01 to 0.5% by mass, and more preferably 0.05 to 0.2% by mass.

(Positive Electrode Current Collector Main Body)

The positive electrode current collector body 14 is formed of a metal material. Examples of the metal material include conductive metals such as copper, aluminum, titanium, nickel, and stainless steel.

The thickness of the positive electrode current collector main body 14 is preferably, for example, 8 to 40 μm, and more preferably 10 to 25 μm.

The thickness of the positive electrode current collector main body 14 and the thickness of the positive electrode current collector 11 can be measured using a micrometer. One example of the measuring instrument usable for this purpose is an instrument with the product name "MDH-25M", manufactured by Mitutoyo Co., Ltd.

(Current Collector Coating Layer)

It is preferable that the positive electrode current collector main body 14 has, on at least a part of its surface, a coating layer (current collector coating layer) 15. The current collector coating layer 15 contains a conductive material.

In this context, the expression "at least a part of its surface" means 10% to 100%, preferably 30% to 100%, and more preferably 50% to 100% with respect to the surface area of the positive electrode current collector main body.

The conductive material in the current collector coating layer 15 preferably contains carbon (conductive carbon). The conductive material in the current collector coating layer 15 more preferably consists exclusively of carbon.

The current collector coating layer 15 is preferred to be, for example, a coating layer containing carbon particles such as carbon black and a binder. Examples of the binder for the current collector coating layer 15 include those listed above as examples of the binder for the positive electrode active material layer 12.

With regard to the production of the positive electrode current collector 11 in which the surface of the positive electrode current collector main body 14 is coated with the current collector coating layer 15, for example, the production can be implemented by a method in which a slurry containing the conductive material, the binder, and a solvent is applied to the surface of the positive electrode current collector main body 14 with a known coating method such as a gravure method, followed by drying to remove the solvent.

The thickness of the current collector coating layer 15 is preferably 0.1 to 4.0 μm.

The thickness of the current collector coating layer can be measured by a method of measuring the thickness of the coating layer in a transmission electron microscope (TEM) image or a scanning electron microscope (SEM) image of a cross section of the current collector coating layer. The thickness of the current collector coating layer need not be uniform. It is preferable that the current collector coating layer having a thickness of 0.1 μm or more is present on at least a part of the surface of the positive electrode current collector main body 14, and the maximum thickness of the current collector coating layer is 4.0 μm or less.

(Oil Absorption Amount of Positive Electrode Active Material Layer)

In the present embodiment, the oil absorption amount of the positive electrode active material layer 12 is 30.0 mL/100 g or more and less than 38.0 mL/100 g, preferably 31.0 to 37.0 mL/100 g, and more preferably 32.0 to 36.0 mL/100 g.

In the present specification, the oil absorption amount of the positive electrode active material layer is the dibutyl phthalate absorption amount of the powder constituting the positive electrode active material layer. The oil absorption amount is a value obtained by the following <<Measuring method of oil absorption amount>>.

When the oil absorption amount of the positive electrode active material is not more than the upper limit of the above range, the dispersed state of the positive electrode active material is excellent, and the input characteristics of the non-aqueous electrolyte secondary battery are excellent. When the oil absorption amount of the positive electrode active material is not less than the lower limit, it is easy to secure a sufficient specific surface area for the charge and discharge reaction of the positive electrode active material particles.

The oil absorption amount of the positive electrode active material layer mainly reflect the dispersed state of the particles in the positive electrode active material layer. That is, when the amount of the oil absorption amount is not more than the upper limit of the above range, the dispersibility of the particles in the positive electrode active material layer is excellent, and the input characteristics of the non-aqueous electrolyte secondary battery are likely to be improved. Here, "the dispersibility of the particles in the positive electrode active material layer is excellent" means that the amounts of the agglomerates of the positive electrode active material itself, the agglomerates of the conducting agent itself, and the aggregates in which they are combined are low, and the addition amounts of the conducting agent or the binder which is a material that easily aggregates in the first place is low.

The oil absorption amount is affected by the particle size, shape, porosity, etc. of the particles in the positive electrode active material layer. For example, when the average particle size of the positive electrode active material particles is increased, oil absorption amount tends to be reduced. When the amount of the conducting agent is reduced, the oil absorption amount tends to be reduced. When the amount of the binder is reduced, the oil absorption amount tends to be reduced. When the dispersant is added, the oil absorption tends to be reduced. When the number of agglomerated particles is small, the oil absorption amount tends to be reduced.

<<Measuring Method of Oil Absorption Amount>>

In the measuring method of oil absorption amount of the positive electrode active material layer, the measurement target is a product obtained by detaching the positive electrode active material layer from the electrode, and vacuum drying the resulting powder in an environment of 120° C. The measurement target is particles constituting the positive electrode active material layer.

For example, the measurement target may be a product obtained by detaching the outermost surface of the positive electrode active material layer with a depth of several μm (e.g. 20 to 30 μm) using a spatula or the like, and vacuum drying the resulting powder in an environment of 120° C. In this process, care must be taken so as not to detach the current collector foil.

The oil absorption amount is measured using the oil absorption amount measuring device specified in JIS K6217-4 (2008).

The torque change and the amount of liquid supplied are measured when the sample (i.e., the measurement target powder) is put into the mixing chamber of the oil absorption amount measuring device, and kneaded at a constant rotation speed while adding the liquid to the sample. Kneading progresses with the lapse of time, and reaches a stage showing a torque curve where the torque rises sharply, relative to the increase in the amount of liquid supplied, and drops after having reached the maximum torque. The end point is defined as the point where 70% of the maximum torque is reached before the maximum torque is reached. The amount of liquid supplied up to the end point is defined as the oil absorption amount. Specifically, the oil absorption amount (unit: mL/100 g) is measured under the following measurement conditions. The measurement is performed in a normal indoor environment (temperature 20 to 25° C., relative humidity 40 to 60%). The measurement can be performed, for example, at a temperature of 25° C. and a relative humidity of 50%.

(Measurement Conditions)

Liquid used: Dibutyl phthalate (DBP).
Sample feed amount: 20.0 g.
Liquid dripping speed: 4.0 mL/min.
Rotor rotation speed: 125 rpm.

(Conductive Carbon Content)

In the present embodiment, the positive electrode active material layer 12 preferably includes conductive carbon. Examples of the embodiment in which the positive electrode active material layer contains conductive carbon include the following embodiments 1 to 3.

Embodiment 1: The positive electrode active material layer contains the conducting agent, wherein the conducting agent contains the conductive carbon.

Embodiment 2: The positive electrode active material layer contains the conducting agent, and the positive electrode active material particles have, on at least at a part of surface thereof, the coated section including the conductive material, wherein one or both of the conductive material of the coated section and the conducting agent contains the conductive carbon.

Embodiment 3: The positive electrode active material layer does not contain the conducting agent, and the positive electrode active material particles have, on at least at a part of surface thereof, the coated section including the conductive material, wherein the conductive material of the coated section contains the conductive carbon.

Embodiment 3 is more preferable in that the oil absorption amount of the positive electrode active material layer tends to be small.

The amount of the conductive carbon is preferably 0.5% by mass or more and less than 3.0% by mass, more preferably 1.0 to 2.8% by mass, and even more preferably 1.2 to 2.6% by mass with respect to the total mass of the positive electrode active material layer.

When the amount of the conductive carbon in the positive electrode active material layer is not less than the lower limit of the above range, the amount of the conductive carbon is sufficient for forming the conductive path in the positive electrode active material layer. When the amount of the conductive carbon in the positive electrode active material layer is not more than the upper limit of the above range, the dispersibility of the conductive carbon is excellent.

The conductive carbon content based the total mass of the positive electrode active material layer can be measured by <<Method for measuring conductive carbon content >> described below with respect to a dried product (powder), as a measurement target, obtained by vacuum-drying, at 120° C., the positive electrode active material layer detached from the positive electrode.

For example, the measurement target may be one obtained by detaching the outermost surface of the positive electrode active material layer with a depth of several μm using a spatula or the like, and vacuum drying the resulting powder in an environment of 120° C.

The conductive carbon to be measured by the <<Method for measuring conductive carbon content>> described below includes carbon in the coating section of the active material, and carbon in the conducting agent. Carbon in the binder is not included in the conductive carbon to be measured. Carbon in the dispersant is not included in the conductive carbon to be measured.

<<Method for Measuring Conductive Carbon Content>>

(Measurement Method A)

A sample having a weight w1 is taken from a homogeneously mixed product of the measurement target, and the sample is subjected to thermogravimetry differential thermal analysis (TG-DTA) implemented by following step A1 and step A2 defined below, to obtain a TG curve. From the obtained TG curve, the following first weight loss amount M1 (unit: % by mass) and second weight loss amount M2 (unit: % by mass) are obtained. By subtracting M1 from M2, the conductive carbon content (unit: % by mass) is obtained.

Step A1: A temperature of the sample is raised from 30° C. to 600° C. at a heating rate of 10° C./min and holding the temperature at 600° C. for 10 minutes in an argon gas stream of 300 mL/min to measure a resulting mass w2 of the sample, from which a first weight loss amount M1 is determined by formula (a1):

$$M1=(w1-w2)/w1\times100 \quad (a1)$$

Step A2: Immediately after the step A1, the temperature is lowered from 600° C. to 200° C. at a cooling rate of 10° C./min and held at 200° C. for 10 minutes, followed by completely substituting the argon gas stream with an oxygen gas stream. The temperature is raised from 200° C. to 1000° C. at a heating rate of 10° C./min and held at 1000° C. for 10 minutes in an oxygen gas stream of 100 mL/min to measure a resulting mass w3 of the sample, from which a second weight loss amount M2 (unit: % by mass) is calculated by formula (a2):

$$M2=(w1-w3)/w1\times100 \quad (a2).$$

(Measurement Method B)

0.0001 mg of a precisely weighed sample is taken from a homogeneously mixed product of the measurement target, and the sample is burnt under burning conditions defined below to measure an amount of generated carbon dioxide by a CHN elemental analyzer, from which a total carbon content M3 (unit: % by mass) of the sample is determined. Also, a first weight loss amount Ml is determined following the procedure of the step A1 of the measurement method A. By subtracting M1 from M3, the conductive carbon content (unit: % by mass) is obtained.

(Burning Conditions)

Temperature of combustion furnace: 1150° C.
Temperature of reduction furnace: 850° C.
Helium flow rate: 200 mL/min.
Oxygen flow rate: 25 to 30 ml/min.

(Measurement Method C)

The total carbon content M3 (unit: % by mass) of the sample is measured in the same manner as in the above measurement method B. Further, the carbon amount M4 (unit: % by mass) of carbon derived from the binder is determined by the following method. M4 is subtracted from M3 to determine a conductive carbon content (unit: % by mass).

When the binder is polyvinylidene fluoride (PVDF: monomer ($CH_2CF_2$), molecular weight 64), the conductive carbon content can be calculated by the following formula from the fluoride ion ($F^-$) content (unit: % by mass) measured by combustion ion chromatography based on the tube combustion method, the atomic weight (19) of fluorine in the monomers constituting PVDF, and the atomic weight (12) of carbon in the PVDF.

PVDF content (unit: % by mass)=fluoride ion content (unit: % by mass)×64/38

PVDF-derived carbon amount $M4$ (unit: % by mass)=fluoride ion content (unit: % by mass)×12/19

The presence of polyvinylidene fluoride as a binder can be verified by a method in which a sample or a liquid obtained by extracting a sample with an N,N-dimethylformamide (DMF) solvent is subjected to Fourier transform infrared spectroscopy (FT-IR) to confirm the absorption attributable to the C—F bond. Such verification can be also implemented by $^{19}$F-NMR measurement.

When the binder is identified as being other than PVDF, the carbon amount M4 attributable to the binder can be calculated by determining the amount (unit: % by mass) of the binder from the measured molecular weight, and the carbon content (unit: % by mass).

When the dispersant is contained, the conductive carbon content (unit: % by mass) can be obtained by subtracting M4 from M3, and further subtracting therefrom the amount of carbon belonging to the dispersant.

Depending on the composition of the positive electrode active material and the like, an appropriate method can be selected from [Measurement method A] to [Measurement method C] to determine the conductive carbon content, but it is preferable to determine the conductive carbon content by the [Measurement method B] in terms of versatility, etc.

These methods are described in the following publications:

Toray Research Center, The TRC News No. 117 (September 2013), pp. 34-37, [Searched on Feb. 10, 2021], Internet <https://www.toray-research.co.jp/technical-info/trcnews/pdf/TRC117(34-37).pdf>

TOSOH Analysis and Research Center Co., Ltd., Technical Report No. T1019 2017.09.20, [Searched on Feb. 10, 2021], Internet <http://www.tosoh-arc.co.jp/techrepo/files/tarc00522/T1719N.pdf>

<<Analytical Method for Conductive Carbon>>

The conductive carbon in the coated section of the active material and the conductive carbon as the conducting agent can be distinguished by the following analytical method.

For example, particles in the positive electrode active material layer are analyzed by a combination of transmission electron microscopy-electron energy loss spectroscopy (TEM-EELS), and particles having a carbon-derived peak around 290 eV only near the particle surface can be judged to be the positive electrode active material. On the other hand, particles having a carbon-derived peak inside the particles can be judged to be the conducting agent. In this context, "near the particle surface" means a region to the depth of 100 nm from the particle surface, while "inside" means an inner region positioned deeper than the "near the particle surface".

As another method, the particles in the positive electrode active material layer are analyzed by Raman spectroscopy mapping, and particles showing carbon-derived G-band and D-band as well as a peak of the positive electrode active material-derived oxide crystals can be judged to be the positive electrode active material. On the other hand, particles showing only G-band and D-band can be judged to be the conducting agent.

As still another method, a cross section of the positive electrode active material layer is observed with scanning spread resistance microscope (SSRM). When the particle surface has a region with lower resistance than the inside of the particle, the region with lower resistance can be judged to be the conductive carbon present in the coated section of the active material. Other particles that are present independently and have low resistance can be judged to be the conducting agent.

In this context, a trace amount of carbon considered to be an impurity and a trace amount of carbon unintentionally removed from the surface of the positive electrode active material during production are not judged to be the conducting agent.

Using any of these methods, it is possible to verify whether or not the conducting agent formed of carbon material is contained in the positive electrode active material layer.

(Volume Density of Positive Electrode Active Material Layer)

In the present embodiment, the volume density of the positive electrode active material layer 12 is preferably 2.20 to 2.70 g/cm$^3$, more preferably 2.25 to 2.50 g/cm$^3$.

The volume density of the positive electrode active material layer can be measured by, for example, the following measuring method.

The thicknesses of the positive electrode 1 and the positive electrode current collector 11 are each measured with a micrometer, and the difference between these two thickness values is calculated as the thickness of the positive electrode active material layer 12. With respect to the thickness of the positive electrode 1 and the thickness of the positive electrode current collector 11, each of these thickness values is an average value of the thickness values measured at five or more randomly chosen points (sufficiently separated from each other). The thickness of the positive electrode current collector 11 may be measured at the exposed section 13 of the positive electrode current collector, which is described below.

The mass of the measurement sample punched out from the positive electrode so as to have a predetermined area is measured, from which the mass of the positive electrode current collector 11 measured in advance is subtracted to calculate the mass of the positive electrode active material layer 12.

The volume density of the positive electrode active material layer 12 is calculated by the following formula (1).

$$\text{Volume density (unit: g/cm}^3\text{)} = \text{mass of positive electrode active material layer (unit: g)} / [(\text{thickness of positive electrode active material layer (unit: cm)}) \times \text{area of measurement sample (Unit: cm}^2\text{)}] \quad (1)$$

When the volume density of the positive electrode active material layer is not less than the lower limit of the above range, excellent input characteristics can be easily obtained in the non-aqueous electrolyte secondary battery. When the volume density of the positive electrode active material layer is not more than the upper limit of the above range, cracks due to the press load are less likely to occur in the positive electrode active material layer, and an excellent conductive path can be formed.

The volume density of the positive electrode active material layer can be controlled by, for example, adjusting the amount of the positive electrode active material, the particle size of the positive electrode active material, the thickness of the positive electrode active material layer 12, and the like. When the positive electrode active material layer contains a conducting agent, the volume density can also be controlled by selecting the type of the conducting agent (specific surface area, specific gravity), or adjusting the amount of the conducting agent, and the particle size of the conducting agent.

Further, when the aggregation of particles in the powder constituting the positive electrode active material layer is small, the thickness of the positive electrode active material layer tends to be small and the volume density tends to be high when the positive electrode active material layer is pressure-pressed. In addition, when the agglomeration of the particles is small, the dispersibility is likely to be improved, and the oil absorption amount of the positive electrode active material layer is likely to be small.

<Method for Producing Positive Electrode>

The present embodiment's method for producing the positive electrode 1 includes a composition preparation step of preparing a positive electrode composition containing a positive electrode active material, and a coating step of coating the positive electrode composition on the positive electrode current collector 11.

For example, the positive electrode 1 can be produced by applying the positive electrode composition containing a positive electrode active material and a solvent onto the positive electrode current collector 11, followed by drying to remove the solvent to form the positive electrode active material layer 12. The positive electrode composition may contain a conducting agent. The positive electrode composition may contain a binder. The positive electrode composition may contain a dispersant.

The thickness of the positive electrode active material layer 12 can be adjusted by a method in which a layered body composed of the positive electrode current collector 11 and the positive electrode active material layer 12 formed thereon is placed between two flat plate jigs and, then, uniformly pressurized in the thickness direction of this layered body. For this purpose, for example, a method of pressurizing using a roll press can be used.

The solvent for the positive electrode composition is preferably a non-aqueous solvent. Examples of the solvent include alcohols such as methanol, ethanol, 1-propanol and 2-propanol; chain or cyclic amides such as N-methylpyrrolidone and N,N-dimethylformamide; and ketones such as acetone. With respect to these solvents, a single type thereof may be used individually or two or more types thereof may be used in combination.

<Non-Aqueous Electrolyte Secondary Battery>

The non-aqueous electrolyte secondary battery 10 of the present embodiment shown in FIG. 2 includes a positive electrode 1 of the present embodiment, a negative electrode 3, and a non-aqueous electrolyte. Further, a separator 2 may be provided. Reference numeral 5 in FIG. 1 denotes an outer casing.

In the present embodiment, the positive electrode 1 has a plate-shaped positive electrode current collector 11 and positive electrode active material layers 12 provided on both surfaces thereof. The positive electrode active material layer 12 is present on a part of each surface of the positive electrode current collector 11. The edge of the surface of the positive electrode current collector 11 is an exposed section 13 of the positive electrode current collector, which is free of the positive electrode active material layer 12. A terminal tab (not shown) is electrically connected to an arbitrary portion of the exposed section 13 of the positive electrode current collector.

The negative electrode 3 has a plate-shaped negative electrode current collector 31 and negative electrode active material layers 32 provided on both surfaces thereof. The negative electrode active material layer 32 is present on a part of each surface of the negative electrode current collector 31. The edge of the surface of the negative electrode current collector 31 is an exposed section 33 of the negative electrode current collector, which is free of the negative electrode active material layer 32. A terminal tab (not shown) is electrically connected to an arbitrary portion of the exposed section 33 of the negative electrode current collector.

The shapes of the positive electrode 1, the negative electrode 3 and the separator 2 are not particularly limited. For example, each of these may have a rectangular shape in a plan view.

With regard to the production of the non-aqueous electrolyte secondary battery 10 of the present embodiment, for example, the production can be implemented by a method in which the positive electrode 1 and the negative electrode 3 are alternately interleaved through the separator 2 to produce an electrode layered body, which is then packed into an outer casing such as an aluminum laminate bag, and a non-aqueous electrolyte (not shown) is injected into the outer casing, followed by sealing the outer casing.

FIG. 2 shows a representative example of a structure of the battery in which the negative electrode, the separator, the positive electrode, the separator, and the negative electrode are stacked in this order, but the number of electrodes can be altered as appropriate. The number of the positive electrode 1 may be one or more, and any number of positive electrodes 1 can be used depending on a desired battery capacity. The number of each of the negative electrode 3 and the separator 2 is larger by one sheet than the number of the positive electrode 1, and these are stacked so that the negative electrode 3 is located at the outermost layer.

(Negative Electrode)

The negative electrode active material layer 32 includes a negative electrode active material. Further, the negative electrode active material layer 32 may further include a binder. Furthermore, the negative electrode active material layer 32 may include a conducting agent as well. The shape of the negative electrode active material is preferably particulate.

For example, the negative electrode 3 can be produced by a method in which a negative electrode composition containing a negative electrode active material, a binder and a solvent is prepared, and coated on the negative electrode current collector 31, followed by drying to remove the solvent to thereby form a negative electrode active material layer 32. The negative electrode composition may contain a conducting agent.

Examples of the negative electrode active material and the conducting agent include carbon materials, lithium titanate (LTO), silicon, silicon monoxide and the like. Examples of the carbon material include graphite, graphene, hard carbon, Ketjen black, acetylene black, carbon nanotube (CNT), and the like. With respect to each of the negative electrode active material and the conducting agent, a single type thereof may be used alone or two or more types thereof may be used in combination.

Examples of the material of the negative electrode current collector 31 include those listed above as examples of the material of the positive electrode current collector 11.

Examples of the binder in the negative electrode composition include polyacrylic acid (PAA), lithium polyacrylate (PAALI), polyvinylidene fluoride (PVDF), polyvinylidene fluoride-propylene hexafluoride copolymer (PVDF-HFP), styrene-butadiene rubber (SBR), polyvinyl alcohol (PVA), polyethylene oxide (PEO), polyethylene glycol (PEG), carboxymethyl cellulose (CMC), polyacrylonitrile (PAN), polyimide (PI) and the like. With respect to the binder, a single type thereof may be used alone or two or more types thereof may be used in combination.

Examples of the organic solvent include alcohols such as methanol, ethanol, 1-propanol and 2-propanol; chain or cyclic amides such as N-methylpyrrolidone (NMP) and N,N-dimethylformamide (DMF); and ketones such as acetone.

Examples of the solvent in the negative electrode composition include water and organic solvents. Examples of the organic solvent include alcohols such as methanol, ethanol, 1-propanol and 2-propanol; chain or cyclic amides such as N-methylpyrrolidone (NMP) and N,N-dimethylformamide (DMF); and ketones such as acetone. With respect to these solvents, a single type thereof may be used individually or two or more types thereof may be used in combination.

The sum of the amount of the negative electrode active material and the amount of the conducting agent is preferably 80.0 to 99.9% by mass, and more preferably 85.0 to 98.0% by mass, based on the total mass of the negative electrode active material layer 32.

(Separator)

The separator 2 is disposed between the negative electrode 3 and the positive electrode 1 to prevent a short circuit or the like. The separator 2 may retain a non-aqueous electrolyte described below.

The separator 2 is not particularly limited, and examples thereof include a porous polymer film, a non-woven fabric, and glass fiber.

An insulating layer may be provided on one or both surfaces of the separator 2. The insulating layer is preferably a layer having a porous structure in which insulating fine particles are bonded with a binder for an insulating layer.

The separator 2 may contain various plasticizers, antioxidants, and flame retardants.

Examples of the antioxidant include phenolic antioxidants such as hinderedphenolic antioxidants, monophenolic antioxidants, bisphenolic antioxidants, and polyphenolic antioxidants; hinderedamine antioxidants; phosphorus antioxidants; sulfur antioxidants; benzotriazole antioxidants; benzophenone antioxidants; triazine antioxidants; and salicylate antioxidants. Among these, phenolic antioxidants and phosphorus antioxidants are preferable.

(Non-Aqueous Electrolyte)

The non-aqueous electrolyte fills the space between the positive electrode 1 and the negative electrode 3. For example, any of known non-aqueous electrolytes used in lithium ion secondary batteries, electric double layer capacitors and the like can be used. As the non-aqueous electrolyte, a non-aqueous electrolyte solution in which an electrolyte salt is dissolved in an organic solvent is preferable.

The organic solvent is preferably one having tolerance to high voltage. Examples of the organic solvent include polar solvents such as ethylene carbonate, propylene carbonate, dimethyl carbonate, diethyl carbonate, ethyl methyl carbonate, γ-butyrolactone, sulfolane, dimethyl sulfoxide, acetonitrile, dimethylformamide, dimethylacetamide, 1,2-dimethoxyethane, 1,2-diethoxyethane, tetrohydrafuran, 2-methyltetrahydrofuran, dioxolane, and methyl acetate, as well as mixtures of two or more of these polar solvents.

The electrolyte salt is not particularly limited, and examples thereof include lithium-containing salts such as $LiClO_4$, $LiPF_6$, $LiBF_4$, $LiAsF_6$, $LiCF_6$, $LiCF_3CO_2$, $LiPF_6SO_3$, $LiN(SO_2F)_2$, $LiN(SO_2CF_3)_2$, $Li(SO_2CF_2CF_3)_2$, $LiN(COCF_3)_2$, and $LiN(COCF_2CF_3)_2$, as well as mixture of two or more of these salts.

The non-aqueous electrolyte secondary battery of this embodiment can be used as a lithium ion secondary battery for various purposes such as industrial use, consumer use, automobile use, and residential use.

The application of the non-aqueous electrolyte secondary battery of this embodiment is not particularly limited. For example, the battery can be used in a battery module configured by connecting a plurality of non-aqueous electrolyte secondary batteries in series or in parallel, a battery system including a plurality of electrically connected battery modules and a battery control system, and the like.

Examples of the battery system include battery packs, stationary storage battery systems, automobile power storage battery systems, automobile auxiliary storage battery systems, emergency power storage battery systems, and the like.

Second Embodiment

In the second embodiment of the present invention, a positive electrode 1 for a non-aqueous electrolyte secondary battery, includes: a positive electrode current collector 11 including a positive electrode current collector main body 14 formed of a metal material; and a positive electrode active material layer 12 provided on the positive electrode current collector 11, wherein: the positive electrode active material layer 12 includes a positive electrode active material; the positive electrode active material includes a compound having an olivine type crystal structure; a volume density of the positive electrode active material layer 12 is 2.2 to 2.7 $g/cm^3$; and the positive electrode suffers no damage when bent once in accordance with a 90° folding endurance test method specified in JIS P 8115 (2001).

According to the positive electrode having the above configuration, it is possible to provide a positive electrode for a non-aqueous electrolyte secondary battery that can improve the volumetric energy density of the non-aqueous electrolyte secondary battery and realize excellent cycling characteristics in a bent state of the positive electrode.

More specific explanation is made below.

(Positive Electrode Active Material Layer)

The positive electrode active material layer 12 includes a positive electrode active material. The positive electrode active material layer 12 preferably further includes a binder. The positive electrode active material layer 12 may further include a conducting agent. In the context of the present specification, the term "conducting agent" refers to a conductive material of a particulate shape, a fibrous shape, etc., which is mixed with the positive electrode active material for the preparation of the positive electrode active material layer or formed in the positive electrode active material layer, and is caused to be present in the positive electrode active material layer in a form connecting the positive electrode active material particles.

The shape of the positive electrode active material is preferably particulate.

The amount of the positive electrode active material (including the mass of the coated section of the active material if present) is preferably 80.0 to 99.9% by mass, and more preferably 90 to 99.5% by mass, based on the total mass of the positive electrode active material layer 12.

The positive electrode active material preferably has, on at least a part of its surface, a coated section including a conductive material (hereinbelow, the positive electrode active material particles having such a coated section of the active material are also referred to as "coated particles"). It is more preferable that the entire surfaces of the positive electrode active material are coated with a conductive material for achieving more excellent battery capacity and cycling performance.

In this context, the expression "at least a part of its surface" means that the coated section of the active material covers 50% or more, preferably 70% or more, more preferably 90% or more, particularly preferably 100% of the total area of the entire outer surfaces of the positive electrode active material. This ratio (%) of the coated section (hereinafter, also referred to as "coverage") is an average value for all the positive electrode active material particles present in the positive electrode active material layer. As long as this average value is not less than the above lower limit value, the positive electrode active material layer may contain a small amount of positive electrode active material particles without the coated section. When the positive electrode active material particles without the coated section are present in the positive electrode active material layer, the amount thereof is preferably 30% by mass or less, more preferably 20% by mass or less, and particularly preferably 10% by mass or less, with respect to the total mass of the positive electrode active material particles present in the positive electrode active material layer.

The coverage can be measured by a method as follows. First, the particles in the positive electrode active material layer are analyzed by the energy dispersive X-ray spectroscopy (TEM-EDX) using a transmission electron microscope. Specifically, an elemental analysis is performed by EDX with respect to the outer peripheral portion of the positive electrode active material particles in a TEM image. The elemental analysis is performed on carbon to identify the carbon covering the positive electrode active material particles. A section with a carbon coating having a thickness of 1 nm or more is defined as a coated section, and the ratio of the coated section to the entire circumference of the observed positive electrode active material particle can be determined as the coverage. The measurement can be performed with respect to, for example, 10 positive electrode active material particles, and an average value thereof can be used as a value of the coverage.

Further, the coated section of the active material is a layer directly formed on the surface of particles (core section) composed of only the positive electrode active material, which has a thickness of 1 nm to 100 nm, preferably 5 nm to 50 nm. This thickness can be determined by the above-mentioned TEM-EDX used for the measurement of the coating ratio.

The conductive material of the coated section of the active material preferably contains carbon (conductive carbon). The conductive material may be composed only of carbon, or may be a conductive organic compound containing carbon and elements other than carbon. Examples of the other elements include nitrogen, hydrogen, oxygen and the like. In the conductive organic compound, the amount of the other elements is preferably 10 atomic % or less, and more preferably 5 atomic % or less.

It is more preferable that the conductive material in the coated section of the active material is composed only of carbon.

The amount of the conductive material is 0.1 to 3.0% by mass, more preferably 0.5 to 1.5% by mass, and even more preferably 0.7 to 1.3% by mass, based on the total mass of the positive electrode active material including the coated section.

For example, the coated section of the active material is formed in advance on the surface of the positive electrode active material particles, and is present on the surface of the positive electrode active material particles in the positive electrode active material layer. That is, the coated section of the active material in the present embodiment is not one newly formed in the steps following the preparation step of a positive electrode composition. In addition, the coated section of the active material is not one that comes off in the steps following the preparation step of a positive electrode composition.

For example, the coated section stays on the surface of the positive electrode active material even when the coated particles are mixed with a solvent by a mixer or the like during the preparation of a positive electrode composition. Further, the coated section stays on the surface of the positive electrode active material even when the positive electrode active material layer is detached from the positive electrode and then put into a solvent to dissolve the binder contained in the positive electrode active material layer in the solvent. Furthermore, the coated section stays on the surface of the positive electrode active material even when an operation to disintegrate agglomerated particles is implemented for measuring the particle size distribution of the particles in the positive electrode active material layer by the laser diffraction scattering method.

Examples of the method for producing the coated particles include a sintering method and a vapor deposition method. Examples of the sintering method include a method that sinters an active material composition (for example, a slurry) containing the positive electrode active material particles and an organic substance at 500 to 1000° C. for 1 to 100 hours under atmospheric pressure. Examples of the organic substance added to the active material composition include salicylic acid, catechol, hydroquinone, resorcinol, pyrogallol, fluoroglucinol, hexahydroxybenzene, benzoic acid, phthalic acid, terephthalic acid, phenylalanine, water dispersible phenolic resins, saccharides (e.g., sucrose, glucose and lactose), carboxylic acids (e.g., malic acid and citric acid), unsaturated monohydric alcohols (e.g., allyl alcohol and propargyl alcohol), ascorbic acid, and polyvinyl alcohol. This sintering method sinters an active material composition to allow carbon in the organic material to be fused to the surface of the positive electrode active material to thereby form the coated section of the active material.

Another example of the sintering method is the so-called impact sintering coating method.

The impact sintering coating method is, for example, carried out as follows. In an impact sintering coating device, a burner is ignited using a mixed gas of a hydrocarbon and oxygen as a fuel to burn the mixed gas in a combustion chamber, thereby generating a flame, wherein the amount of oxygen is adjusted so as not to exceed its equivalent amount that allows complete combustion of the fuel, to thereby lower the flame temperature. A powder supply nozzle is installed downstream thereof, from which a solid-liquid-gas three-phase mixture containing a combustion gas as well as a slurry formed by dissolving an organic substance for coating in a solvent is injected toward the flame. The injected fine powder is accelerated at a temperature not higher than the transformation temperature, the sublimation temperature, and the evaporation temperature of the powder material by increasing the amount of combustion gas maintained at room temperature to lower the temperature of the injected fine powder. This allows the particles of the powder to be instantly fused on the active material by impact, thereby forming coated particles of the positive electrode active material.

Examples of the vapor deposition method include a vapor phase deposition method such as a physical vapor deposition method (PVD) and a chemical vapor deposition method (CVD), and a liquid phase deposition method such as plating.

Further, the thickness of the positive electrode active material layer (total thickness of the positive electrode active material layers in the case where the positive electrode active material layers are formed on both sides of the positive electrode current collector) is preferably 30 to 500

μm, more preferably 40 to 400 μm, particularly preferably 50 to 300 μm. When the thickness of the positive electrode active material layer is not less than the lower limit value of the above range, it is possible to provide a positive electrode that can be used for manufacturing a battery having excellent energy density per unit volume. When the thickness is not more than the upper limit value of the above range, the peel strength of the positive electrode active material layer can be improved, thereby preventing delamination of the positive electrode active material layer during charging/discharging.

The positive electrode active material contains a compound having an olivine crystal structure.

The compound having an olivine crystal structure is preferably a compound represented by the following formula: $LiFe_xM_{(1-x)}PO_4$ (hereinafter, also referred to as "formula (I)"). In the formula (I), $0 \leq x \leq 1$. M is Co, Ni, Mn, Al, Ti or Zr. A minute amount of Fe and M (Co, Ni, Mn, Al, Ti or Zr) may be replaced with another element so long as the replacement does not affect the physical properties of the compound. The presence of a trace amount of metal impurities in the compound represented by the formula (I) does not impair the effect of the present invention.

The compound represented by the formula (I) is preferably lithium iron phosphate represented by $LiFePO_4$ (hereinafter, also simply referred to as "lithium iron phosphate"). The compound is more preferably lithium iron phosphate particles having, on at least a part of their surfaces, a coated section including a conductive material (hereinafter, also referred to as "coated lithium iron phosphate particles"). It is more preferable that the entire surfaces of lithium iron phosphate particles are coated with a conductive material (that is, the coverage is 100%) for achieving more excellent battery capacity and cycling performance.

The coated lithium iron phosphate particles can be produced by a known method.

For example, the coated lithium iron phosphate particles can be obtained by a method in which a lithium iron phosphate powder is prepared by following the procedure described in Japanese Patent No. 5098146, and at least a part of the surface of lithium iron phosphate particles in the powder is coated with carbon by following the procedure described in GS Yuasa Technical Report, June 2008, Vol. 5, No. 1, pp. 27-31 and the like.

Specifically, first, iron oxalate dihydrate, ammonium dihydrogen phosphate, and lithium carbonate are weighed to give a specific molar ratio, and these are pulverized and mixed in an inert atmosphere. Next, the obtained mixture is heat-treated in a nitrogen atmosphere to prepare a lithium iron phosphate powder. Then, the lithium iron phosphate powder is placed in a rotary kiln and heat-treated while supplying methanol vapor with nitrogen as a carrier gas to obtain a powder of lithium iron phosphate particles having at least a part of their surfaces coated with carbon.

For example, the particle size of the lithium iron phosphate powder can be adjusted by optimizing the crushing time in the crushing process. The amount of carbon coating the particles of the lithium iron phosphate powder can be adjusted by optimizing the heating time and temperature in the step of implementing heat treatment while supplying methanol vapor. It is desirable to remove the carbon particles not consumed for coating by subsequent steps such as classification and washing.

The positive electrode active material may contain other positive electrode active materials than the compound having an olivine type crystal structure.

Preferable examples of the other positive electrode active materials include a lithium transition metal composite oxide. Specific examples thereof include lithium cobalt oxide ($LiCoO_2$), lithium nickel oxide ($LiNiO_2$), lithium nickel cobalt aluminum oxide ($LiNi_xCo_yAl_zO_2$ with the proviso that x+y+z=1), lithium nickel cobalt manganese oxide ($LiNi_xCo_yMn_zO_2$ with the proviso that x+y+z=1), lithium manganese oxide ($LiMn_2O_4$), lithium manganese cobalt oxide ($LiMnCoO_4$), lithium manganese chromium oxide ($LiMnCrO_4$), lithium vanadium nickel oxide ($LiNiVO_4$), nickel-substituted lithium manganese oxide (e.g., $LiMn_{1.5}Ni_{0.5}O_4$), and lithium vanadium cobalt oxide ($LiCoVO_4$), as well as nonstoichiometric compounds formed by partially substituting the compounds listed above with metal elements. Examples of the metal element include one or more selected from the group consisting of Mn, Mg, Ni, Co, Cu, Zn and Ge.

With respect to the other positive electrode active materials, a single type thereof may be used individually or two or more types thereof may be used in combination.

The other positive electrode active material may have, on at least a part of its surface, the coated section described above.

The amount of the compound having an olivine type crystal structure is preferably 50% by mass or more, preferably 80% by mass or more, and even more preferably 90% by mass or more, based on the total mass of the positive electrode active material (including the mass of the coated section of the active material if present). This amount may be 100% by mass.

When the coated lithium iron phosphate particles are used, the amount of the coated lithium iron phosphate particles is preferably 50% by mass or more, more preferably 80% by mass or more, and even more preferably 90% by mass or more, based on the total mass of the positive electrode active material (including the mass of the coated section of the active material if present). This amount may be 100% by mass.

The thickness of the coated section of the active material of the positive electrode active material is preferably 1 to 100 nm.

The thickness of the coated section of the active material of the positive electrode active material can be measured by a method of measuring the thickness of the coated section of the active material in a transmission electron microscope (TEM) image of the positive electrode active material. The thickness of the coated section of the active material on the surface of the positive electrode active material need not be uniform. It is preferable that the positive electrode active material has, on at least a part of its surface, the coated section of the active material having a thickness of the above lower limit value or more, and the maximum thickness of the coated section of the active material is not more than the above upper limit value.

The average particle size of the positive electrode active material particles (that is, positive electrode active material powder) (including the thickness of the coated section of the active material if present) is, for example, preferably 0.1 to 20.0 μm, and more preferably 0.2 to 10.0 μm. When two or more types of positive electrode active materials are used, the average particle size of each of such positive electrode active materials may be within the above range.

The average particle size of the positive electrode active material in the present specification is a volume-based median particle size measured using a laser diffraction/scattering particle size distribution analyzer.

The binder that can be contained in the positive electrode active material layer 12 is an organic substance, and examples thereof include polyacrylic acid, lithium polyacrylate, polyvinylidene fluoride, polyvinylidene fluoride-hexafluoropropylene copolymers, styrene butadiene rubbers, polyvinyl alcohol, polyvinyl acetal, polyethylene oxide, polyethylene glycol, carboxymethyl cellulose, polyacrylic nitrile, and polyimide. With respect to the binder, a single type thereof may be used alone or two or more types thereof may be used in combination.

When the positive electrode active material layer 12 contains a binder, the amount of the binder in the positive electrode active material layer 12 is preferably 0.1 to 4.0% by mass, and more preferably 0.5 to 2.0% by mass, based on the total mass of the positive electrode active material layer 12.

When the amount of the binder in the positive electrode active material layer 12 is not less than the lower limit of the above range, the effect of improving the peel strength is excellent. When the amount of the binder in the positive electrode active material layer 12 is not more than the upper limit of the above range, the proportion of the positive electrode active material increases, so that the volumetric energy density improves.

Examples of the conducting agent contained in the positive electrode active material layer 12 include carbon materials such as carbon black (e.g., Ketjen black, and acetylene black), graphite, graphene, hard carbon, and carbon nanotube (CNT). With respect to the conducting agent, a single type thereof may be used alone or two or more types thereof may be used in combination.

The amount of the conducting agent in the positive electrode active material layer 12 is, for example, preferably 4 parts by mass or less, more preferably 3 parts by mass or less, and even more preferably 1 part by mass or less, relative to 100 parts by mass of the total mass of positive electrode active material. It is particularly preferable that the positive electrode active material layer 12 does not contain a conducting agent, and it is desirable that there are no independent conducting agent particles (for example, independent carbon particles).

The "conducting agent" is a conductive material independent of the positive electrode active material, and may include a conductive material having a fibrous form (for example, carbon nanotube) as well as isolated conducting agent particles.

The conducting agent in contact with the positive electrode active material particles in the positive electrode active material layer is not regarded as the conductive material constituting the coated section of the positive electrode active material.

When the conducting agent is incorporated into the positive electrode active material layer 12, the lower limit value of the amount of the conducting agent is appropriately determined according to the type of the conducting agent, and is, for example, more than 0.1% by mass, based on the total mass of the positive electrode active material layer 12.

That is, when the positive electrode active material layer 12 contains the conducing agent, the amount of the conducing agent is preferably 0.2 to 4 parts by mass, more preferably 0.3 to 3 parts by mass, and even more preferably 0.5 to 1 parts by mass, relative to 100 parts by mass of the total mass of positive electrode active material layer 12.

In the context of the present specification, the expression "the positive electrode active material layer 12 does not contain a conducting agent" or similar expression means that the positive electrode active material layer 12 does not substantially contain a conducting agent, and should not be construed as excluding a case where a conducting agent is contained in such an amount that the effects of the present invention are not affected. For example, if the amount of the conducting agent is 0.1% by mass or less, based on the total mass of the positive electrode active material layer 12, then, it is judged that substantially no conducting agent is contained.

(Positive Electrode Current Collector)

The positive electrode current collector body 14 is formed of a metal material. Examples of the metal material include conductive metals such as copper, aluminum, titanium, nickel, and stainless steel.

The thickness of the positive electrode current collector main body 14 is preferably, for example, 8 to 40 µm, and more preferably 10 to 25 µm.

The thickness of the positive electrode current collector main body 14 and the thickness of the positive electrode current collector 11 can be measured using a micrometer. One example of the measuring instrument usable for this purpose is an instrument with the product name "MDH-25M", manufactured by Mitutoyo Co., Ltd.

(Current Collector Coating Layer)

The current collector coating layer 15 contains a conductive material.

The conductive material in the current collector coating layer 15 preferably contains carbon, and more preferably consists exclusively of carbon.

The current collector coating layer 15 is preferred to be, for example, a coating layer containing carbon particles such as carbon black and a binder. Examples of the binder for the current collector coating layer 15 include those listed above as examples of the binder for the positive electrode active material layer 12.

With regard to the production of the positive electrode current collector 11 in which the surface of the positive electrode current collector main body 14 is coated with the current collector coating layer 15, for example, the production can be implemented by a method in which a slurry containing the conductive material, the binder, and a solvent is applied to the surface of the positive electrode current collector main body 14 with a known coating method such as a gravure method, followed by drying to remove the solvent.

The thickness of the current collector coating layer 15 is preferably 0.1 to 4.0 µm.

The thickness of the current collector coating layer can be measured by a method of measuring the thickness of the coating layer in a transmission electron microscope (TEM) image or a scanning electron microscope (SEM) image of a cross section of the current collector coating layer. The thickness of the current collector coating layer need not be uniform. It is preferable that the current collector coating layer having a thickness of 0.1 µm or more is present on at least a part of the surface of the positive electrode current collector main body 14, and the maximum thickness of the current collector coating layer is 4.0 µm or less.

(Method for Producing Positive Electrode)

For example, the positive electrode 1 of the present embodiment can be produced by a method in which a positive electrode composition containing a positive electrode active material, a binder and a solvent is coated on the positive electrode current collector 11, followed by drying to remove the solvent to thereby form a positive electrode active material layer 12. The positive electrode composition may contain a conducting agent.

The thickness of the positive electrode active material layer 12 can be adjusted by a method in which a layered body composed of the positive electrode current collector 11 and the positive electrode active material layer 12 formed thereon is placed between two flat plate jigs and, then, uniformly pressurized in the thickness direction of this layered body. For this purpose, for example, a method of pressurizing using a roll press can be used.

The solvent for the positive electrode composition is preferably a non-aqueous solvent. Examples of the solvent include alcohols such as methanol, ethanol, 1-propanol and 2-propanol; chain or cyclic amides such as N-methylpyrrolidone and N,N-dimethylformamide; and ketones such as acetone. With respect to these solvents, a single type thereof may be used individually or two or more types thereof may be used in combination.

In the present embodiment, the volume density of the positive electrode active material layer 12 is 2.2 to 2.7 g/cm$^3$, preferably 2.3 to 2.6 g/cm$^3$.

The volume density of the positive electrode active material layer 12 can be measured by, for example, the following measuring method.

The thicknesses of the positive electrode 1 and the positive electrode current collector 11 are each measured with a micrometer, and the difference between these two thickness values is calculated as the thickness of the positive electrode active material layer 12. With respect to the thickness of the positive electrode 1 and the thickness of the positive electrode current collector 11, each of these thickness values is an average value of the thickness values measured at five or more randomly chosen points (sufficiently separated from each other). The thickness of the positive electrode current collector 11 may be measured at the exposed section 13 of the positive electrode current collector, which is described below.

The mass of the measurement sample punched out from the positive electrode so as to have a predetermined area is measured, from which the mass of the positive electrode current collector 11 measured in advance is subtracted to calculate the mass of the positive electrode active material layer 12.

The volume density of the positive electrode active material layer 12 is calculated by the following formula (1).

Volume density (unit: g/cm$^3$)=mass of positive electrode active material layer (unit: g)/[(thickness of positive electrode active material layer (unit: cm))×area of measurement sample (unit: cm$^2$)]  (1)

When the volume density of the positive electrode active material layer 12 is not less than the lower limit value of the above range, the excellent effect of improving the volumetric energy density is achieved. When the volume density is not more than the upper limit value, excellent peel strength of the positive electrode active material layer 12 is achieved. When the volume density of the positive electrode active material layer 12 is too high, cracks and breaking are likely to occur in the positive electrode active material layer 12 in the 90° folding endurance test described later, and the peel strength tends to decrease. When the volume density is too low, the contact between substances such as the electrode active material, conducting agent, and positive electrode current collector that contribute to conductivity tends to be weak, and as a result, the peel strength tends to be low and the impedance tends to be high.

The volume density of the positive electrode active material layer 12 can be controlled by, for example, adjusting the amount of the positive electrode active material, the particle size of the positive electrode active material, the thickness of the positive electrode active material layer 12, and the like. When the positive electrode active material layer 12 contains a conducting agent, the volume density can also be controlled by selecting the type of the conducting agent (specific surface area, specific gravity), or adjusting the amount of the conducting agent, and the particle size of the conducting agent.

The positive electrode 1 of the present embodiment suffers no damage when bent once in accordance with a 90° folding endurance test method specified in JIS P 8115 (2001). It is preferable that the positive electrode 1 suffers no damage when bent five times. One bending operation is an operation of bending the positive electrode at 90° and straitening the bent positive electrode back to 180° immediately after the 90°-bending. No damage means that the positive electrode active material layer suffers no crack, no breaking, no peeling, or no chipping. The "breaking" means that the entire positive electrode including the current collector is broken. The "crack" means a crack having a width of 100 µm or more and a depth of 10 µm or more. The "peeling" means delamination with its maximum in the direction orthogonal to the thickness direction of the positive electrode being 1000 µm or more. The "chipping" means a chipping with its maximum length being 500 µm or more. The cracks, peeling, and chipping can be confirmed by, for example, an optical microscope or a scanning electron microscope (SEM).

The 90° folding endurance test is specifically performed under the following conditions.

Size of test piece: width 15 mm, length approximately 110 mm.

Load: 0.25 kgf

Radius of curvature of the bending clamp: 2.0 mm.

When cutting out the test pieces from the object to be measured, 5 test pieces are prepared while changing the length direction of the object.

When all the test pieces suffer no crack, no breaking, or no peeling when bent once, it is determined that "the positive electrode suffers no damage when bent once". Even one of the five test pieces suffers cracks, it is determined that "the positive electrode suffers damage when bent once".

When all the test pieces suffer no crack, no breaking, or no peeling when bent 5 times, it is determined that "the positive electrode suffers no damage when bent 5 times". Even one of the five test pieces suffers cracks, it is determined that "the positive electrode suffers damage when bent 5 times".

In the present embodiment, the fact that the volume density of the positive electrode active material layer is within the above range and that the positive electrode active material layer suffers no damage in accordance with a 90° folding endurance test indicates that the bound state of the group of particles existing in the positive electrode active material layer is excellent in stability against bending.

It is possible to prevent the positive electrode active material layer from being damaged in folding endurance test by improving the stability of the group of particles in the bound state against bending.

The stability of the group of particles in the bound state against bending can be controlled by, for example, adjusting the amount of the positive electrode active material, the particle size of the positive electrode active material, the thickness of the positive electrode active material layer 12, and the like. When the positive electrode active material layer 12 contains a conducting agent, the stability of the group of particles in the bound state against bending can also be controlled by selecting the type of the conducting agent (specific surface area, specific gravity), or adjusting the amount of the conducting agent, and the particle size of the conducting agent.

For example, the stability of the group of particles in the bound state against bending can be improved by reducing the blending amount of the conducting agent having a large specific surface area and a small particle size and suppressing the amount of the binder used as much as possible.

In the present embodiment, one or both of the positive electrode current collector 11 and the positive electrode active material layer 12 preferably include conductive carbon.

When the positive electrode active material layer 12 contains conductive carbon, it is preferable that at least one of the conductive material coating the positive electrode active material and the conducting agent contains the carbon.

When the positive electrode current collector 11 contains conductive carbon, it is preferable that the conductive material in the current collector coating layer 15 contains the carbon.

The positive electrode 1 preferably has a conductive carbon content of 0.5 to 3.5% by mass, and more preferably 1.5 to 3.0% by mass with respect to the mass of the positive electrode 1 excluding the positive electrode current collector main body 14.

When the positive electrode 1 is composed of the positive electrode current collector main body 14 and the positive electrode active material layer 12, the mass of the positive electrode 1 excluding the positive electrode current collector main body 14 is the mass of the positive electrode active material layer 12.

When the positive electrode 1 is composed of the positive electrode current collector main body 14, the current collector coating layer 15, and the positive electrode active material layer 12, the mass of the positive electrode 1 excluding the positive electrode current collector main body 14 is the sum of the mass of the current collector coating layer 15 and the mass of the positive electrode active material layer 12.

When the amount of the conductive carbon with respect to the mass of the positive electrode 1 excluding the positive electrode current collector main body 14 is not less than the lower limit of the above range, the electrode is excellent in charge and discharge cycling property in a state of being bent by 90°. When the amount of the conductive carbon with respect to the mass of the positive electrode 1 excluding the positive electrode current collector main body 14 is not more than the upper limit of the above range, excellent effect of improving the volume density is achieved.

The amount of the conductive carbon is preferably 0.5% by mass or more and less than 3.0% by mass, more preferably 1.0 to 2.8% by mass, and more preferably 1.2 to 2.6% by mass, based on the total mass of the positive electrode active material layer.

The amount of the conductive carbon with respect to the mass of the positive electrode 1 excluding the positive electrode current collector main body 14 can be measured by <<Method for measuring conductive carbon content>> described below with respect to a dried product (powder), as a measurement target, obtained by detaching the whole of a layer present on the positive electrode current collector main body 14, collecting the whole of substance resulting from the detached layer, and vacuum-drying the collected substance at 120° C.

The amount of conductive carbon with respect to the total mass of the positive electrode active material layer can be measured by <<Method for measuring conductive carbon content>> described below with respect to a dried product (powder), as a measurement target, obtained by vacuum-drying, at 120° C., the positive electrode active material layer detached from the positive electrode.

The conductive carbon to be measured by the <<Method for measuring conductive carbon content>> described below includes carbon in the coated section of the positive electrode active material, carbon in the conducting agent, and carbon in the current collector coating layer 15. Carbon in the binder is not included in the conductive carbon to be measured.

As a method for obtaining the measurement target, for example, the following method can be adopted.

First, the layer (powder) present on the positive electrode current collector main body 14 is completely detached by a method in which the positive electrode 1 is punched to obtain a piece having a predetermined size, and the piece of the positive electrode current collector main body 14 is immersed in a solvent (for example, N-methylpyrrolidone) and stirred. Next, after confirming that no powder remains attached to the positive electrode current collector main body 14, the positive electrode current collector main body 14 is taken out from the solvent to obtain a suspension (slurry) containing the detached powder and the solvent. The obtained suspension is dried at 120° C. to completely volatilize the solvent to obtain the desired measurement target (powder).

<<Method for Measuring Conductive Carbon Content>>
(Measurement Method A)

A sample having a weight w1 is taken from a homogeneously mixed product of the measurement target, and the sample is subjected to thermogravimetry differential thermal analysis (TG-DTA) implemented by following step A1 and step A2 defined below, to obtain a TG curve. From the obtained TG curve, the following first weight loss amount M1 (unit: % by mass) and second weight loss amount M2 (unit: % by mass) are obtained. By subtracting M1 from M2, the conductive carbon content (unit: % by mass) is obtained.

Step A1: A temperature of the sample is raised from 30° C. to 600° C. at a heating rate of 10° C./min and holding the temperature at 600° C. for 10 minutes in an argon gas stream of 300 mL/min to measure a resulting mass w2 of the sample, from which a first weight loss amount M1 is determined by formula (a1):

$$M1=(w1-w2)/w1\times 100 \tag{a1}$$

Step A2: Immediately after the step A1, the temperature is lowered from 600° C. to 200° C. at a cooling rate of 10° C./min and held at 200° C. for 10 minutes, followed by completely substituting the argon gas stream with an oxygen gas stream. The temperature is raised from 200° C. to 1000° C. at a heating rate of 10° C./min and held at 1000° C. for 10 minutes in an oxygen gas stream of 100 mL/min to measure a resulting mass w3 of the sample, from which a second weight loss amount M2 (unit: % by mass) is calculated by formula (a2):

$$M2=(w1-w3)/w1\times 100 \tag{a2}$$

(Measurement Method B)

0.0001 mg of a precisely weighed sample is taken from a homogeneously mixed product of the measurement target, and the sample is burnt under burning conditions defined below to measure an amount of generated carbon dioxide by a CHN elemental analyzer, from which a total carbon content M3 (unit: % by mass) of the sample is determined. Also, a first weight loss amount M1 is determined following the procedure of the step A1 of the measurement method A. By subtracting M1 from M3, the conductive carbon content (unit: % by mass) is obtained.
(Burning Conditions)
Temperature of combustion furnace: 1150° C.
Temperature of reduction furnace: 850° C.
Helium flow rate: 200 mL/min.
Oxygen flow rate: 25 to 30 mL/min.
(Measurement Method C)

The total carbon content M3 (unit: % by mass) of the sample is measured in the same manner as in the above measurement method B. Further, the carbon amount M4 (unit: % by mass) of carbon derived from the binder is determined by the following method. M4 is subtracted from M3 to determine a conductive carbon content (unit: % by mass).

When the binder is polyvinylidene fluoride (PVDF: monomer ($CH_2CF_2$), molecular weight 64), the conductive carbon content can be calculated by the following formula from the fluoride ion ($F^-$) content (unit: % by mass) measured by combustion ion chromatography based on the tube combustion method, the atomic weight (19) of fluorine in the monomers constituting PVDF, and the atomic weight (12) of carbon in the PVDF.

PVDF content (unit: % by mass)=fluoride ion content (unit: % by mass)×64/38

PVDF-derived carbon amount $M4$ (unit: % by mass)=fluoride ion content (unit: % by mass)×12/19

The presence of polyvinylidene fluoride as a binder can be verified by a method in which a sample or a liquid obtained by extracting a sample with an N,N-dimethylformamide (DMF) solvent is subjected to Fourier transform infrared spectroscopy (FT-IR) to confirm the absorption attributable to the C—F bond. Such verification can be also implemented by $^{19}F$-NMR measurement.

When the binder is identified as being other than PVDF, the carbon amount M4 attributable to the binder can be calculated by determining the amount (unit: % by mass) of the binder from the measured molecular weight, and the carbon content (unit: % by mass).

Depending on the composition of the positive electrode active material and the like, an appropriate method can be selected from [Measurement method A] to [Measurement method C] to determine the conductive carbon content, but it is preferable to determine the conductive carbon content by the [Measurement method B] in terms of versatility, etc.

These methods are described in the following publications:

Toray Research Center, The TRC News No. 117 (September 2013), pp. 34-37, [Searched on Feb. 10, 2021], Internet <https://www.toray-research.co.jp/technical-info/trcnews/pdf/TRC117(34-37).pdf>

TOSOH Analysis and Research Center Co., Ltd., Technical Report No. T1019 2017.09.20, [Searched on Feb. 10, 2021], Internet <http://www.tosoh-arc.co.jp/techrepo/files/tarc00522/T1719N.pdf>

<<Analytical Method for Conductive Carbon>>

The conductive carbon in the coated section of the active material and the conductive carbon as the conducting agent can be distinguished by the following analytical method.

For example, particles in the positive electrode active material layer are analyzed by a combination of transmission electron microscopy-electron energy loss spectroscopy (TEM-EELS), and particles having a carbon-derived peak around 290 eV only near the particle surface can be judged to be the positive electrode active material. On the other hand, particles having a carbon-derived peak inside the particles can be judged to be the conducting agent. In this context, "near the particle surface" means a region to the depth of 100 nm from the particle surface, while "inside" means an inner region positioned deeper than the "near the particle surface".

As another method, the particles in the positive electrode active material layer are analyzed by Raman spectroscopy mapping, and particles showing carbon-derived G-band and D-band as well as a peak of the positive electrode active material-derived oxide crystals can be judged to be the positive electrode active material. On the other hand, particles showing only G-band and D-band can be judged to be the conducting agent.

As still another method, a cross section of the positive electrode active material layer is observed with scanning spread resistance microscope (SSRM). When the particle surface has a region with lower resistance than the inside of the particle, the region with lower resistance can be judged to be the conductive carbon present in the coated section of the active material. Other particles that are present independently and have low resistance can be judged to be the conducting agent.

In this context, a trace amount of carbon considered to be an impurity and a trace amount of carbon unintentionally removed from the surface of the positive electrode active material during production are not judged to be the conducting agent.

Using any of these methods, it is possible to verify whether or not the conducting agent formed of carbon material is contained in the positive electrode active material layer.

In the present embodiment, the peel strength of the positive electrode active material layer 12 is preferably 10 to 1,000 mN/cm, more preferably 20 to 500 mN/cm, and even more preferably 40 to 250 mN/cm.

In the context of the present specification, the peel strength of the positive electrode active material layer 12 is the 180° peel strength obtained by the measuring method described in the Examples section described below.

The peel strength can be controlled by, for example, adjusting the amounts of the binder and the conducting agent. The larger the amount of the binder, the higher the peel strength. By reducing the amount of the conducting agent, which has a large surface area and requires more binder than the active material, the amount of binder required to obtain satisfactory peel strength can be reduced.

When the peel strength of the positive electrode active material layer 12 is not less than the lower limit value of the above range, excellent binding is achieved between the particles forming the positive electrode active material layer 12, and excellent adhesion is achieved between the positive electrode current collector 11 and the positive electrode active material layer 12. When the peel strength of the positive electrode active material layer 12 is not more than the upper limit value of the above range, the amounts of the conductive carbon and the binder are presumably optimized, leading to excellent effect of improving the energy density of the non-aqueous electrolyte secondary battery.

<Non-Aqueous Electrolyte Secondary Battery>

The non-aqueous electrolyte secondary battery 10 of the present embodiment shown in FIG. 2 includes a positive electrode 1 of the present embodiment, a negative electrode 3, and a non-aqueous electrolyte. Further, a separator 2 may be provided. Reference numeral 5 in FIG. 1 denotes an outer casing.

In the present embodiment, the positive electrode 1 has a plate-shaped positive electrode current collector 11 and positive electrode active material layers 12 provided on both surfaces thereof. The positive electrode active material layer 12 is present on a part of each surface of the positive electrode current collector 11. The edge of the surface of the positive electrode current collector 11 is an exposed section 13 of the positive electrode current collector, which is free of the positive electrode active material layer 12. A terminal tab (not shown) is electrically connected to an arbitrary portion of the exposed section 13 of the positive electrode current collector.

The negative electrode 3 has a plate-shaped negative electrode current collector 31 and negative electrode active material layers 32 provided on both surfaces thereof. The negative electrode active material layer 32 is present on a part of each surface of the negative electrode current collector 31. The edge of the surface of the negative electrode current collector 31 is an exposed section 33 of the negative electrode current collector, which is free of the negative electrode active material layer 32. A terminal tab (not shown) is electrically connected to an arbitrary portion of the exposed section 33 of the negative electrode current collector.

The shapes of the positive electrode 1, the negative electrode 3 and the separator 2 are not particularly limited. For example, each of these may have a rectangular shape in a plan view.

With regard to the production of the non-aqueous electrolyte secondary battery 10 of the present embodiment, for example, the production can be implemented by a method in which the positive electrode 1 and the negative electrode 3 are alternately interleaved through the separator 2 to produce an electrode layered body, which is then packed into an outer casing such as an aluminum laminate bag, and a non-aqueous electrolyte (not shown) is injected into the outer casing, followed by sealing the outer casing.

FIG. 2 shows a representative example of a structure of the battery in which the negative electrode, the separator, the positive electrode, the separator, and the negative electrode are stacked in this order, but the number of electrodes can be altered as appropriate. The number of the positive electrode 1 may be one or more, and any number of positive electrodes 1 can be used depending on a desired battery capacity. The number of each of the negative electrode 3 and the separator 2 is larger by one sheet than the number of the positive electrode 1, and these are stacked so that the negative electrode 3 is located at the outermost layer.

(Negative Electrode)

The negative electrode active material layer 32 includes a negative electrode active material. Further, the negative electrode active material layer 32 may further include a binder. Furthermore, the negative electrode active material layer 32 may include a conducting agent as well. The shape of the negative electrode active material is preferably particulate.

For example, the negative electrode 3 can be produced by a method in which a negative electrode composition containing a negative electrode active material, a binder and a solvent is prepared, and coated on the negative electrode current collector 31, followed by drying to remove the solvent to thereby form a negative electrode active material layer 32. The negative electrode composition may contain a conducting agent.

Examples of the negative electrode active material and the conducting agent include carbon materials such as graphite, graphene, hard carbon, Ketjen black, acetylene black, and carbon nanotube (CNT). With respect to each of the negative electrode active material and the conducting agent, a single type thereof may be used alone or two or more types thereof may be used in combination.

Examples of the material of the negative electrode current collector 31, the binder and the solvent in the negative electrode composition include those listed above as examples of the material of the positive electrode current collector 11, the binder and the solvent in the positive electrode composition. With respect to each of the binder and the solvent in the negative electrode composition, a single type thereof may be used alone or two or more types thereof may be used in combination.

The sum of the amount of the negative electrode active material and the amount of the conducting agent is preferably 80.0 to 99.9% by mass, and more preferably 85.0 to 98.0% by mass, based on the total mass of the negative electrode active material layer 32.

(Separator)

The separator 2 is disposed between the negative electrode 3 and the positive electrode 1 to prevent a short circuit or the like. The separator 2 may retain a non-aqueous electrolyte described below.

The separator 2 is not particularly limited, and examples thereof include a porous polymer film, a non-woven fabric, and glass fiber.

An insulating layer may be provided on one or both surfaces of the separator 2. The insulating layer is preferably a layer having a porous structure in which insulating fine particles are bonded with a binder for an insulating layer.

The separator 2 may contain various plasticizers, antioxidants, and flame retardants.

Examples of the antioxidant include phenolic antioxidants such as hinderedphenolic antioxidants, monophenolic antioxidants, bisphenolic antioxidants, and polyphenolic antioxidants; hinderedamine antioxidants; phosphorus antioxidants; sulfur antioxidants; benzotriazole antioxidants; benzophenone antioxidants; triazine antioxidants; and salicylate antioxidants. Among these, phenolic antioxidants and phosphorus antioxidants are preferable.

(Non-Aqueous Electrolyte)

The non-aqueous electrolyte fills the space between the positive electrode 1 and the negative electrode 3. For example, any of known non-aqueous electrolytes used in lithium ion secondary batteries, electric double layer capacitors and the like can be used. As the non-aqueous electrolyte, a non-aqueous electrolyte solution in which an electrolyte salt is dissolved in an organic solvent is preferable.

The organic solvent is preferably one having tolerance to high voltage. Examples of the organic solvent include polar solvents such as ethylene carbonate, propylene carbonate, dimethyl carbonate, diethyl carbonate, ethyl methyl carbonate, ybutyrolactone, sulfolane, dimethyl sulfoxide, acetonitrile, dimethylformamide, dimethylacetamide, 1,2-dimethoxyethane, 1,2-diethoxyethane, tetrahydrafuran, 2-methyltetrahydrofuran, dioxolane, and methyl acetate, as well as mixtures of two or more of these polar solvents.

The electrolyte salt is not particularly limited, and examples thereof include lithium-containing salts such as $LiClO_4$, $LiPF_6$, $LiBF_4$, $LiAsF_6$, $LiCF_6$, $LiCF_3CO_2$, $LiPF_6SO_3$, $LiN(SO_2F)_2$, $LiN(SO_2CF_3)_2$, $Li(SO_2CF_2CF_3)_2$, $LiN(COCF_3)_2$, and $LiN(COCF_2CF_3)_2$, as well as mixture of two or more of these salts.

The non-aqueous electrolyte secondary battery of this embodiment can be used as a lithium ion secondary battery for various purposes such as industrial use, consumer use, automobile use, and residential use.

The application of the non-aqueous electrolyte secondary battery of this embodiment is not particularly limited. For example, the battery can be used in a battery module configured by connecting a plurality of non-aqueous electrolyte secondary batteries in series or in parallel, a battery system including a plurality of electrically connected battery modules and a battery control system, and the like.

Examples of the battery system include battery packs, stationary storage battery systems, automobile power storage battery systems, automobile auxiliary storage battery systems, emergency power storage battery systems, and the like.

According to the present embodiment, a non-aqueous electrolyte secondary battery having an excellent volumetric energy density can be obtained. For example, a volumetric energy density of 245 Wh/L or more, preferably 260 Wh/L or more, and more preferably 275 Wh/L or more can be achieved.

According to this embodiment, the impedance of the non-aqueous electrolyte secondary battery can be reduced.

According to this embodiment, it is possible to obtain a non-aqueous electrolyte secondary battery having excellent cycling characteristics in a bent state of the positive electrode. Specifically, it is possible to obtain a non-aqueous electrolyte secondary battery having an excellent capacity retention in the 90° bending cycle test described in Examples described later.

The positive electrode 1 of the present embodiment is excellent in bending strength and bending strength. Therefore, it can be suitably used for a method of manufacturing a positive electrode by a roll-to-roll method, which comprises a step of winding a sheet-shaped positive electrode into a roll shape.

Further, the positive electrode 1 of the present embodiment can also be suitable used as a positive electrode of a non-aqueous electrolyte secondary battery provided with a wound electrode assembly.

Further, in the present invention, the features of the first embodiment, and the second embodiment described above can be appropriately combined. Specifically, the present invention further provides the following embodiments.

[C1] A positive electrode for a non-aqueous electrolyte secondary battery, including a positive electrode current collector and a positive electrode active material layer which includes a positive electrode active material (positive electrode active material particles), and is provided on the positive electrode current collector, wherein at least one of [C1-1] and [C1-2] below are satisfied:

[C1-1] a dibutyl phthalate oil absorption amount of the positive electrode active material layer is 30.0 mL/100 g or more and less than 38.0 mL/100 g, preferably 31.0 to 37.0 mL/100 g, and more preferably 32.0 to 36.0 mL/100 g; and

[C1-2] a positive electrode current collector includes a positive electrode current collector main body formed of a metal material, wherein the positive electrode active material (positive electrode active material particles) includes a compound having an olivine type crystal structure, a volume density of the positive electrode active material layer is 2.2 to 2.7 g/cm$^3$, and preferably 2.3 to 2.6 g/cm$^3$, and the positive electrode suffers no damage when bent once in accordance with a 90° folding endurance test method specified in JIS P 8115 (2001).

[C2] The positive electrode according to [C1], wherein the positive electrode active material layer includes a conducting agent, which is preferably at least one conducting agent selected from the group consisting of graphite, graphene, hard carbon, Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, relative to 100 parts by mass of a total mass of the positive electrode active material.

[C3] The positive electrode according to [C1], wherein the positive electrode active material layer does not contain a conducting agent.

[C4] The positive electrode according to any one of [C1] to [C3], wherein the positive electrode active material (positive electrode active material particles) has, on at least a part of its surface, coated section including a conductive material, wherein an amount of the conductive material is preferably 0.1 to 4.0% by mass, more preferably 0.1 to 3.0% by mass, and even more preferably 0.5 to 3.0% by mass, even more preferably 0.5 to 1.5% by mass, even more preferably 0.7 to 2.5% by mass, and particularly preferably 0.7 to 1.3% by mass with respect to a total mass of the positive electrode active material including the coated section.

[C5] The positive electrode according to any one of [C1] to [C4], wherein one or both of the positive electrode current collector and the positive electrode active material layer includes a conductive carbon.

[C6] The positive electrode according to any one of [C5], wherein the positive electrode active material layer includes a conductive carbon, and an amount of the conductive carbon is 0.5% by mass or more and less than 3.0% by mass, preferably 1.0 to 2.8% by mass, and more preferably 1.2 to 2.6% by mass with respect to a total mass of the positive electrode active material layer.

[C7] The positive electrode according to [C5] or [C6], wherein the positive electrode active material (positive electro active material particles) has, on at least a part of a surface thereof, a coated section which includes the conductive carbon and has a thickness of 1 to 100 nm.

[C8] The positive electrode according to any one of [C4] to [C7], wherein an amount of the conductive carbon is 0.5 to 3.5% by mass, and preferably 1.5 to 3.0% by mass with respect to a mass of the positive electrode excluding the positive electrode current collector main body.

[C9] The positive electrode according to any one of [C1] to [C8], wherein the positive electrode current collector has, on at least a part of its surface, a current collector coating layer including a conductive material on a side of the positive electrode active material layer, wherein the conductive material in the current collector coating layer preferably includes carbon, and the conductive material in the current collector coating layer more preferably consists exclusively of carbon, wherein a thickness of the current collector coating layer is preferably 0.1 to 4.0 μm.

[C10] The positive electrode according to any one of [C1] to [C9], wherein the positive electrode active material layer includes a binder, and an amount of the binder is 0.1 to 1.0% by mass, and preferably 0.3 to 0.8% by mass with respect to a total mass of the positive electrode active material layer.

[C11] The positive electrode according to any one of [C1] to [C10], wherein a volume density of the positive electrode active material layer is 2.20 to 2.70 g/cm³, and preferably 2.25 to 2.50 g/cm³.

[C12] The positive electrode according to any one of [C1] to [C11], wherein the positive electrode active material particles include a compound represented by formula LiFe$_x$M$_{(1-x)}$PO$_4$, wherein 0≤x≤1 and M is Co, Ni, Mn, Al, Ti, or Zr, and the compound is preferably lithium iron phosphate represented by LiFePO$_4$.

[C13] The positive electrode according to any one of [C1] to [C12], wherein the positive electrode suffers no damage when bent 5 times in accordance with the 90° folding endurance test method.

[C14] The positive electrode according to any one of [C1] to [C13], which is produced by a roll-to-roll method.

[C15] A non-aqueous electrolyte secondary battery including the positive electrode according to any one of [C1] to [C14], a negative electrode, and a non-aqueous electrolyte provided between the positive electrode and the negative electrode.

[C16] The non-aqueous electrolyte secondary battery according to [B15], which includes a wound electrode assembly, wherein the positive electrode and the negative electrode are wound together with a separator provided therebetween.

[C17] A battery module or a battery system comprising a plurality of the non-aqueous electrolyte secondary batteries according to [C15] or [C16].

[C18] A method for producing the positive electrode according to any one of [C1] to [C13], which is processed by a roll-to-roll method.

[C19] A method for producing the non-aqueous electrolyte secondary battery according to [C16], wherein the positive electrode according to any one of [C1] to [C13], the negative electrode, and the separator are processed by a roll-to-roll method.

EXAMPLES

Hereinbelow, the present invention will be described with reference to Examples which, however, should not be construed as limiting the present invention.

<Measurement Method>
(Measurement Method of Oil Absorption Amount)

The positive electrode active material layer on the positive electrode current collector was detached with a spatula to obtain the group of particles constituting the positive electrode active material layer. A dried product (powder) obtained by vacuum-drying the obtained the group of particles in an environment of 120° C. was used as a sample.

The oil absorption amount was measured by the method described in the above<<Measuring method of oil absorption amount>> using the oil absorption amount measuring device (manufactured by ASAHISOUKEN CORPORATION, product name "S-500", based on JIS K6217-4). Dibutyl phthalate manufactured by Wako Pure Chemical Industries, Ltd. was used as the liquid to be supplied to the sample.

(Volume Density Measuring Method)

The thickness of the positive electrode sheet and the thickness of the positive electrode current collector at its exposed section were measured using a micrometer. Each thickness was measured at 5 arbitrarily chosen points, and an average value was calculated. The thickness of the exposed section of positive electrode current collector was subtracted from the thickness of the positive electrode sheet to obtain the thickness of the positive electrode active material layer.

5 sheets of measurement samples were prepared by punching the positive electrode sheet into circles with a diameter of 16 mm.

The mass of each measurement sample was weighed with a precision balance, and the mass of the positive electrode active material layer in the measurement sample was calculated by subtracting the mass of the positive electrode current collector measured in advance from the measurement result. The volume density of the positive electrode active material layer was calculated from the average value of measured values by the above formula (1).

<Evaluation Methods>
(Input Characteristics (Quick Charge Test))

The input characteristics were evaluated following the procedures (1) to (7) below.

(1) A non-aqueous electrolyte secondary battery (cell) was manufactured so as to have a rated capacity of 1 Ah.

(2) The obtained cell was charged at a constant current rate of 0.2 C (that is, 200 mA) and with a cut-off voltage of 3.6 V, and then charged at a constant voltage with a cut-off current set at 1/10 of the above-mentioned charge current (that is, 20 mA) in an environment of 25° C.

(3) The cell was discharged for capacity confirmation at a constant current rate of 0.2 C and with a cut-off voltage of 2.5 V in an environment of 25° C. The discharge capacity at this time was set as the reference capacity, and the reference capacity was set as the current value at 1 C rate (that is, 1,000 mA).

(4) The cell was charged at a constant current rate of 0.2 C (that is, 200 mA) and with a cut-off voltage of 3.8 V in an environment of 25° C. The charge capacity measured at this time was set as the charge capacity at a 0.2 C rate.

(5) The cell was discharged at a constant current rate of 0.2 C and with a cut-off voltage of 2.5 V in an environment of 25° C.

(6) The cell was charged at a constant current rate of 3.0 C (that is, 3000 mA) and with a cut-off voltage of 3.8 V in an environment of 25° C. The charge capacity measured at this time was set as the charge capacity at a 3.0 C rate.

(7) By dividing the charge capacity at 3.0 C rate measured in (6) by the charge capacity at 0.2 C rate measured in (4) to obtain an input (quick charge) characteristic value at 3.0 C (unit: %) in terms of percentage.

The higher this value, the smaller the decrease in charge capacity due to the increased charge rate, and the better the input characteristics (quick charge characteristics) of the non-aqueous electrolyte secondary battery.

In Table 2, "CC" means "Constant Current".

Production Example 1: Production of Negative Electrode 100 parts by mass of artificial graphite as a negative electrode active material, 1.5 parts by mass of styrene-butadiene rubber as a binder, 1.5 parts by mass of carboxymethyl cellulose Na as a thickener, and water as a solvent were mixed, to thereby obtain a negative electrode composition having a solid content of 50% by mass.

The obtained negative electrode composition was applied onto both sides of a copper foil (thickness 8 μm) and vacuum dried at 100° C. Then, the resulting was pressure-pressed under a load of 2 kN to obtain a negative electrode sheet.

The obtained negative electrode sheet was punched to obtain a negative electrode.

Production Example 2: Production of Current Collector Having Current Collector Coating Layer A slurry was obtained by mixing 100 parts by mass of carbon black, 40 parts by mass of polyvinylidene fluoride as a binder, and N-methylpyrrolidone (NMP) as a solvent. The amount of NMP used was the amount required for applying the slurry.

The obtained slurry was applied to both the front and back surfaces of an aluminum foil (positive electrode current collector main body) having a thickness of 15 μm by a gravure method so as to allow the resulting current collector coating layers after drying (total of layers on both sides) to have a thickness of 2 μm, and dried to remove the solvent, thereby obtaining a positive electrode current collector. The current collector coating layers on both surfaces were formed so as to have the same amount of coating and the same thickness.

Examples A1 to A11

Examples A1 to A6 are implementation of the present invention, while Examples A7 and A11 are comparative examples.

As the positive electrode active material particles, the following three types of lithium iron phosphate particles having a coated section (hereinafter, also referred to as "carbon-coated active material") were used.

Carbon-coated active material (1.0): average particle diameter 1.0 μm, carbon content 1.5% by mass.

Carbon-coated active material (1.2): average particle diameter 1.2 μm, carbon content 1.5% by mass.

Carbon-coated active material (10): average particle diameter 10 μm, carbon content 2.5% by mass.

In all of the carbon-coated active materials (1.0), (1.2), and (10), the thickness of the coated section was in the range of 1 to 100 nm.

Carbon black (CB) or carbon nanotube (CNT) was used as the conducting agent. Impurities in the CB and the CNT are below the quantification limit; therefore, both of the CB and the CNT can be regarded as having a carbon content of 100% by mass.

Polyvinylidene fluoride (PVDF) was used as a binder.
Polyvinylpyrrolidone (PVP) was used as the dispersant.
N-methylpyrrolidone (NMP) was used as a solvent.

As a positive electrode current collector, the aluminum foil having the current collector coating layer obtained in Production Example 2 or the aluminum foil (thickness 15 μm) not having the current collector coating layer was used.

A positive electrode active material layer was formed by the following method.

With the blending ratio shown in Table 1, the positive electrode active material particles, the conducting agent, the binder, the dispersant, and the solvent (NMP) were mixed with a mixer to obtain a positive electrode composition. The amount of the solvent used was the amount required for applying the positive electrode composition. Each blending amounts of the positive electrode active material particles, the conducting agent, the binder, and the dispersant shown in Table 1 are ratios with respect to 100% by mass of total thereof other than the solvent (that is, total amount of the positive electrode active material particles, the conducting agent, the binder, and the dispersant).

The obtained positive electrode composition was applied to both surfaces of the positive electrode current collector, and after pre-drying, and the applied composition was vacuum-dried at 120° C. to form positive electrode active material layers. The amount of the applied positive electrode composition is shown in Table 2. The positive electrode active material layers on both surfaces of the positive electrode current collector were formed so as to have the same coating amount and the same thickness. The obtained laminate was pressure-pressed to obtain a positive electrode sheet. The load for the pressure-press is shown in Table 1.

The obtained positive electrode sheet was punched to obtain a positive electrode.

In Example 4, the stirring speed of the mixer was increased to further improve the dispersibility as compared with Example 3 when preparing the positive electrode composition.

With respect to the obtained positive electrode sheet, the oil absorption amount of the positive electrode active material layer, the amount of conductive carbon and the amount of binder with respect to the total mass of the positive electrode active material layer, and the volume density of the positive electrode active material layer were determined. The results are shown in Table 2.

The oil absorption amount of the positive electrode active material layer and the thickness and the volume density of the positive electrode active material layer were measured by the above method.

The carbon content and compounding amount of the carbon-coated active material, and the carbon content and compounding amount of the conducting agent, were used to calculate the conductive carbon content with respect to the total mass of the positive electrode active material layer. The conductive carbon content with respect to the total mass of the positive electrode active material layer can also be confirmed by the <<Method for measuring conductive carbon content>> described above.

The compounding amount of the binder was used to calculate the binder content with respect to the total mass of the positive electrode active material layer. the binder content with respect to the total mass of the positive electrode active material layer can also be confirmed by the «Method for measuring conductive carbon content>> described above.

A non-aqueous electrolyte secondary battery having a configuration shown in FIG. 2 was manufactured by the following method.

$LiPF_6$ as an electrolyte was dissolved at 1 mol/L in a solvent in which ethylene carbonate (EC) and diethyl carbonate (DEC) were mixed at a volume ratio, EC:DEC, of 3:7, to thereby prepare a non-aqueous electrolytic solution.

The positive electrode obtained in this example and the negative electrode obtained in Production Example 1 were alternately interleaved through a separator to prepare an electrode layered body with its outermost layer being the negative electrode. A polyolefin film (thickness 15 μm) was used as the separator.

In the step of producing the electrode layered body, the separator 2 and the positive electrode 1 were first stacked, and then the negative electrode 3 was stacked on the separator 2.

Terminal tabs were electrically connected to the exposed section 13 of the positive electrode current collector and the exposed section 33 of the negative electrode current collector in the electrode layered body, and the electrode layered body was put between aluminum laminate films while allowing the terminal tabs to protrude to the outside. Then, the resulting was laminate-processed and sealed at three sides.

To the resulting structure, a non-aqueous electrolytic solution was injected from one side left unsealed, and this one side was vacuum-sealed to manufacture a non-aqueous electrolyte secondary battery (laminate cell).

The input characteristics were measured by the quick charge test by the above method. The results are shown in Table 2.

TABLE 1

| | POSITIVE ELECTRODE COMPOSITION | | | | | | | | |
|---|---|---|---|---|---|---|---|---|---|
| | POSITIVE ELECTRODE ACTIVE MATERIAL PARTICLES | | CONDUCTING AGENT | | BINDER | DISPERSANT | SOLVENT | COATING | LOAD FOR |
| | TYPE | BLENDING AMOUNT [% BY MASS] | TYPE | BLENDING AMOUNT [% BY MASS] | BLENDING AMOUNT [% BY MASS] | BLENDING AMOUNT [% BY MASS] | BLENDING AMOUNT [% BY MASS] | AMOUNT (BOTH SIDES) mg/cm$^2$ | PRESSURE-PRESS kN |
| Ex. 1 | CARBON-COATED ACTIVE MATERIAL (1.2) | 99.50 | — | 0.0 | 0.5 | 0.00 | NECESSARY AMOUNT | 33.0 | 15 |
| Ex. 2 | CARBON-COATED ACTIVE MATERIAL (1.0) | 99.50 | — | 0.0 | 0.5 | 0.00 | | 33.0 | 20 |
| Ex. 3 | CARBON-COATED ACTIVE MATERIAL (10) | 99.50 | — | 0.0 | 0.5 | 0.00 | | 33.0 | 15 |
| Ex. 4 | CARBON-COATED ACTIVE MATERIAL (10) | 99.50 | — | 0.0 | 0.5 | 0.00 | | 33.0 | 15 |
| Ex. 5 | CARBON-COATED ACTIVE MATERIAL (1.0) | 99.50 | — | 0.0 | 0.5 | 0.00 | | 33.0 | 5 |
| Ex. 6 | CARBON-COATED ACTIVE MATERIAL (1.0) | 99.45 | CB CNT | 0.8 0.2 | 0.5 | 0.05 | | 33.4 | 15 |
| Ex. 7 | CARBON-COATED ACTIVE MATERIAL (10) | 93.50 | CB | 4.0 | 2.5 | 0.00 | | 35.1 | 10 |
| Ex. 8 | CARBON-COATED ACTIVE MATERIAL (10) | 94.30 | CB | 4.0 | 1.5 | 0.20 | | 34.8 | 10 |
| Ex. 9 | CARBON-COATED ACTIVE MATERIAL (1.2) | 93.30 | CB | 5.0 | 1.5 | 0.20 | | 35.2 | 10 |
| Ex. 10 | CARBON-COATED ACTIVE MATERIAL (10) | 97.00 | CB | 2.0 | 1.0 | 0.00 | | 33.9 | 15 |
| Ex. 11 | CARBON-COATED ACTIVE MATERIAL (10) | 93.50 | CB | 4.0 | 2.5 | 0.00 | | 35.1 | 10 |

TABLE 2

| | POSITIVE ELECTRODE ACTIVE MATERIAL LAYER | | | | | CURRENT | INPUT CHARACTE-ISTIC |
|---|---|---|---|---|---|---|---|
| UNIT | OIL ABSORPTION AMOUNT mL/100 g | AMOUNT OF CUNDUCTIVE CARBON % BY MASS | AMOUNT OF BINDER % BY MASS | THICKNESS (BOTH SIDES) μm | VOLUME DENSITY g/cm$^3$ | COLLECTOR COATING LAYER — | (CC FAST CHARGE) 3.0 C./0.2 C. % |
| Ex. 1 | 33.6 | 1.5 | 0.5 | 140 | 2.35 | PRESENT | 80 |
| Ex. 2 | 33.3 | 1.5 | 0.5 | 135 | 2.45 | PRESENT | 82 |
| Ex. 3 | 34.9 | 2.5 | 0.5 | 143 | 2.30 | PRESENT | 88 |
| Ex. 4 | 33.8 | 2.5 | 0.5 | 143 | 2.30 | PRESENT | 91 |
| Ex. 5 | 33.1 | 1.5 | 0.5 | 157 | 2.10 | PRESENT | 76 |
| Ex. 6 | 37.1 | 2.0 | 0.5 | 145 | 2.30 | ABSENT | 80 |

TABLE 2-continued

| | POSITIVE ELECTRODE ACTIVE MATERIAL LAYER | | | | | CURRENT COLLECTOR COATING LAYER | INPUT CHARACTE- ISTIC (CC FAST CHARGE) 3.0 C./0.2 C. |
|---|---|---|---|---|---|---|---|
| UNIT | OIL ABSORPTION AMOUNT mL/100 g | AMOUNT OF CUNDUCTIVE CARBON % BY MASS | AMOUNT OF BINDER % BY MASS | THICKNESS (BOTH SIDES) μm | VOLUME DENSITY g/cm$^3$ | — | % |
| Ex. 7 | 40.3 | 6.5 | 2.5 | 171 | 2.05 | ABSENT | 54 |
| Ex. 8 | 39.1 | 6.5 | 1.5 | 166 | 2.10 | ABSENT | 49 |
| Ex. 9 | 43.5 | 6.5 | 1.5 | 172 | 2.05 | ABSENT | 46 |
| Ex. 10 | 38.7 | 4.5 | 1.0 | 150 | 2.25 | ABSENT | 51 |
| Ex. 11 | 40.1 | 6.5 | 2.5 | 171 | 2.05 | PRESENT | 66 |

As shown in the results in Table 2, Examples A1 to A6, in which the oil absorption amount of the positive electrode active material layer was less than 38.0 mL/g, showed high input characteristics (quick charge characteristics). The compositions of the positive electrode composition of Example A3 and the positive electrode composition of Example A4 are the same, however, Example A4 with improved dispersibility showed lower oil absorption amount than Example A3, and the input characteristics were further improved. From the comparison between Example A3 and Example A4, it can be understood that the oil absorption amount contributes to the improvement of the input characteristics.

Examples A1 to A3 do not contain a conducting agent, and the types and volume densities of the carbon-coated active materials are different from each other. The oil absorption amount of Example A3 was almost the same as the oil absorption amount of Examples A1 and A2, and there is no tendency for the oil adsorption to increase even when the amount of the conductive carbon on the surface of the positive electrode active material is large. In Example A3, the input characteristics were superior to those of Examples A1 and A2 since the conductivity of the surface of the active material was improved.

The oil absorption amount of Example A1 was almost the same as the oil absorption amount of Examples A5. However, in Example A1, the input characteristics were superior to those of Example A5 since the volume density of the positive electrode was high, there were few voids in the positive electrode active material layer, and the conductive path between the active materials was excellent.

In Example A6, carbon nanotube (CNT) and carbon black (CB) were used as conducting agent. The oil absorption of Example A6 was in the preferable range although the oil absorption of CNT tends to increase easier than that of CB. Further, the input characteristics were excellent even in the absence of the current collector coating layer. In Example A6, it was presumed that the dispersibility was excellent since the total amount of the conducting agent was small, and the dispersant was contained.

On the other hand, in Examples A7 to A11, in which the oil absorption of the positive electrode active material layer was 38.0 mL/100 g or more, the input characteristics were inferior to those in Examples A1 to A6.

In Examples A7, A8, A10, and A11, the carbon-coated active material (10) was used. In Examples A7, A8, A10, A11, the oil absorption amount is likely to be reduced since the surface area increases when the average particle size of the active material is large. However, Examples A7, A8, A10, and A11 had a larger amount of oil absorption and inferior input characteristics as compared with Examples A1 to A6.

In Example A7, it was presumed that the dispersibility was inferior since the amount of the conducting agent and the binder was large.

In Example A8, the amount of the binder was reduced as compared with Example A7, and the dispersant was added, so that the oil absorption amount was reduced, however, the input characteristics were not improved. It was presumed that the resistance increased due to the large amount of the dispersant, which was a resin, added.

In Example A10, the amount of the conducting agent and the binder were reduced and the volume density was increased as compared with Example A7, however, the reduction of oil absorption amount was insufficient, so that the input characteristics were not improved.

In Example A11, the current collector coating layer was added as compared with Example 7. The input characteristics were higher than that of Example 7, however, it was insufficient.

In Example A9, the average particle size of the carbon-coated active material was made smaller and the volume density was reduced as compared with Example A8. The oil absorption amount was large and the input characteristics were low as compared with Example 8. This is probably because there were many agglomerates and the dispersibility was not good.

Measurement Method in Examples B1 to B9

(Volume Density Measuring Method)

The thickness of the positive electrode sheet and the thickness of the positive electrode current collector at its exposed section 13 were measured using a micrometer. Each thickness was measured at 5 randomly chosen points (sufficiently separated from each other), and an average value was calculated.

5 sheets of measurement samples were prepared by punching the positive electrode sheet into circles with a diameter of 16 mm.

Each measurement sample was weighed with a precision balance, and the mass of the positive electrode active material layer 12 in the measurement sample was calculated by subtracting the mass of the positive electrode current collector 11 measured in advance from the measurement result. The volume density of the positive electrode active material layer was calculated from the average value of measured values by the above formula (1).

(Measurement Method for Peel Strength)

Figure 3:
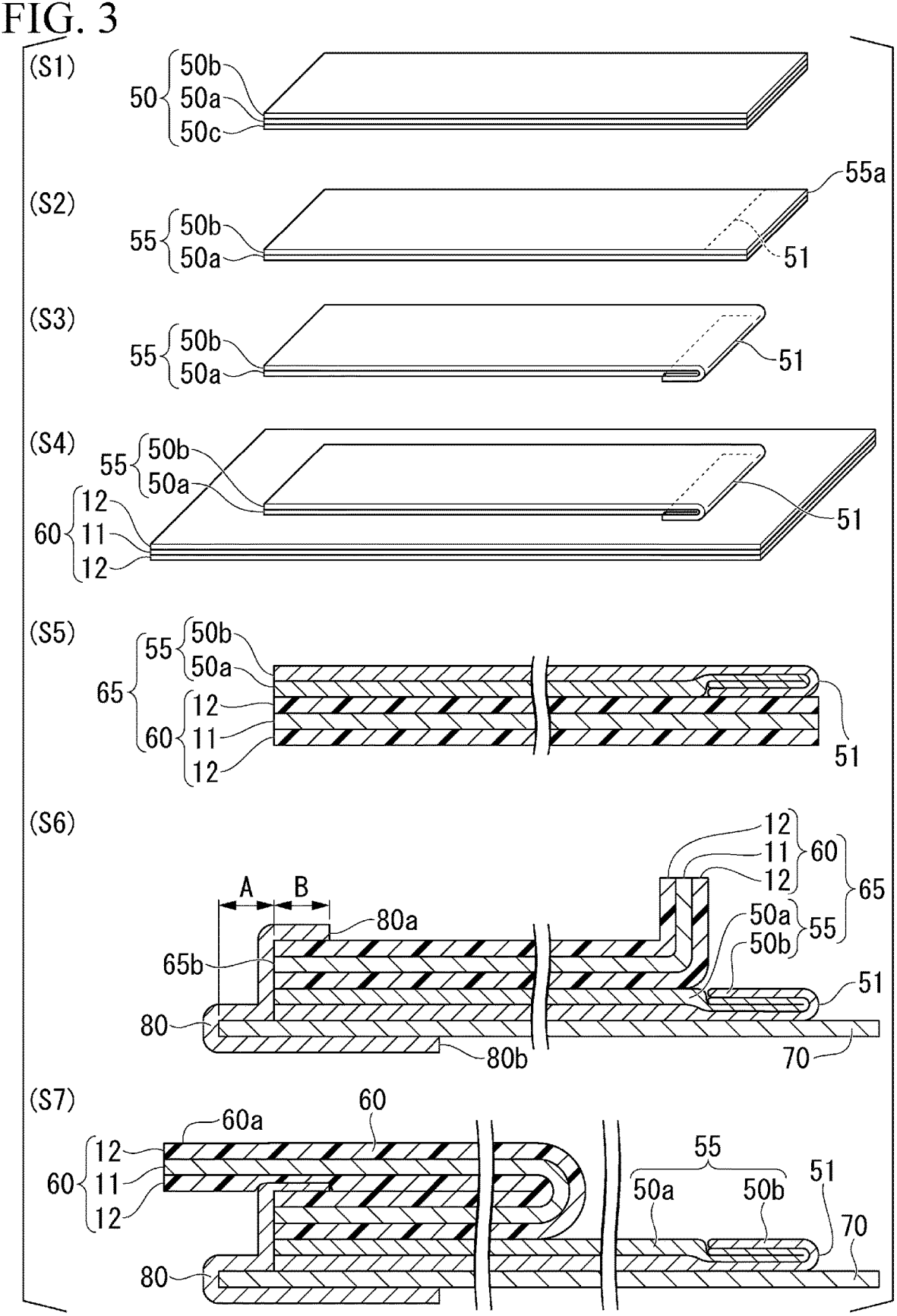
FIG. 3 is a process diagram for explaining a method for measuring the peel strength of a positive electrode active material layer.

The peel strength of the positive electrode active material layer 12 was measured by the following method using a tensile tester. FIG. 3 is a process diagram showing a method for measuring the peel strength of the positive electrode active material layer. The steps (S1) to (S7) shown in FIG. 3 are respectively described below. FIG. 3 is a schematic diagram for facilitating the understanding of the configuration, and the dimensional ratios and the like of each component do not necessarily represent the actual ones.

(S1) First, a rectangular double-sided tape 50 having a width of 25 mm and a length of 120 mm is prepared. In the double-sided tape 50, release papers 50b and 50c are laminated on both sides of the adhesive layer 50a. As the double-sided tape 50, a product manufactured and sold by Nitto Denko Corporation with a product name "No. 5015, 25 mm width" is used.

(S2) The release paper 50c on one side of the double-sided tape 50 is peeled off to obtain an adhesive body 55 with the surface of the adhesive layer 50a (hereinafter, also referred to as "glue surface") being exposed. In the adhesive body 55, a bending position 51 is provided at a distance of about 10 mm from one end 55a in the longitudinal direction of the adhesive body 55.

(S3) The adhesive body 55 is bent at a position on the one end 55a side as viewed from the bending position 51 such that the glue surfaces adhere to each other.

(S4) The adhesive body 55 and the positive electrode sheet 60 are bonded together such that the glue surface of the adhesive body 55 and the positive electrode active material layer 12 of the positive electrode sheet 60 are in contact with each other.

(S5) The positive electrode sheet 60 is cut out along the outer edge of the adhesive body 55, and the adhesive body 55 and the positive electrode sheet 60 are crimped to obtain a composite 65 by a method of reciprocating a crimping roller twice in the longitudinal direction.

(S6) The outer surface of the composite 65 on the adhesive body 55 side is brought into contact with one surface of a stainless plate 70, and the other end 65b on the side opposite to the bending position 51 is fixed to the stainless plate 70 with a mending tape 80. As the mending tape 80, a product manufactured and sold by 3M Company with a product name "Scotch Tape Mending Tape 18 mm×30 Small Rolls 810-1-18D" is used. The length of the mending tape 80 is about 30 mm, the distance A from an end of the stainless plate 70 to the other end 65b of the composite 65 is about 5 mm, and the distance B from one end 80a of the mending tape 80 to the other end 65b of the composite 65 is 5 mm. The other end 80b of the mending tape 80 is attached to the other surface of the stainless plate 70.

(S7) At the end of the composite 65 on the bending position 51 side, the positive electrode sheet 60 is slowly peeled off from the adhesive 55 in parallel with the longitudinal direction. The end (hereinafter, referred to as "peeling end") 60a of the positive electrode sheet 60 that is not fixed by the mending tape 80 is slowly peeled off until it protrudes from the stainless steel plate 70.

Next, the stainless plate 70 to which the composite 65 is fixed is installed on a tensile tester (product name "EZ-LX", manufactured by Shimadzu Corporation) (not shown), the end of the adhesive 55 on the bending position 51 side is fixed, and the peeling end 60a of the positive electrode sheet 60 is pulled in the direction opposite to the bending position 51 (180° direction with respect to the bending position 51) at a test speed of 60 min/min, a test force of 50,000 mN, and a stroke of 70 mm to measure the peel strength. The average value of the peel strength at a stroke of 20 to 50 mm is taken as the peel strength of the positive electrode active material layer 12.

(Folding Endurance Test)

The 90° folding endurance test specified in JIS P 8115 (2001) described above was performed. The presence or absence of damage was evaluated when bent once. No damage was determined as "A", and damage was determined as "B".

The positive electrode, which was evaluated as A when bent once, was bent 5 times to evaluate the presence or absence of damage. No damage was determined as "A", and damage was determined as "B".

Evaluation Method in Examples B1 to B9

(Measurement Method for Volumetric Energy Density)

The evaluation of the volumetric energy density was performed according to the following procedures (1) to (3).

(1) A cell was prepared so as to have a rated capacity of 1 Ah, and the volume of the cell was measured. The volume was measured by Archimedes' principle. The volume measurement may be performed by other methods. To name a few, a method using a laser volume meter or a 3D scan can be employed.

(2) In an environment of 25° C. (room temperature), the obtained cell was charged at a constant current rate of 0.2 C (that is, 200 mA) and with a cut-off voltage of 3.6 V, then charged at a constant voltage with a cut-off current set at $1/10$ of the above-mentioned charge current (that is, 20 mA), and then a 30-minute pause was provided in the open circuit state.

(3) The cell was discharged at a constant current rate of 0.2 C and with a cut-off voltage of 2.5 V. By dividing the total discharge power (unit: Wh) measured from the start of discharge to the end of discharge by the cell volume (unit: L) measured in (1) to obtain to obtain the volumetric energy density (unit: Wh/L).

(Measurement Method for Impedance)

A cell was prepared so as to have a rated capacity of 1 Ah, and the obtained cell was charged at a constant current rate of 0.2 C (that is, 200 mA) and with a cut-off voltage of 3.6 V in an environment of 25° C. (room temperature). Then, the cell was charged at a constant voltage with a cut-off current set at $1/10$ of the above-mentioned charge current (that is, 20 mA), followed by measurement of impedance under the conditions of room temperature (25° C.) and frequency of 1 kHz.

The measurement was carried out by 4-terminal method in which a current terminal and a voltage terminal are attached to the positive and negative electrode tabs, respectively. As an example, an impedance analyzer manufactured by BioLogic was used for the measurement.

(90 Degree Bending Cycle Test)

The capacity retention was evaluated following the procedures (1) to (7) below.

(1) A non-aqueous electrolyte secondary battery (laminate cell), in which two points of the cell are bent at 90° so that the radius of curvature R is 5 mm, was manufactured so as to have a rated capacity of 1 Ah, and a cycling evaluation was carried out at room temperature (25° C.).

(2) The obtained cell was charged at a constant current rate of 0.2 C (that is, 200 mA) and with a cut-off voltage of 3.6 V, and then charged at a constant voltage with a cut-off current set at $1/10$ of the above-mentioned charge current (that is, 20 mA).

(3) The cell was discharged for capacity confirmation at a constant current rate of 0.2 C and with a cut-off voltage of 2.5 V. The discharge capacity at this time was set as the reference capacity, and the reference capacity was set as the current value at 1 C rate (that is, 1,000 mA).

(4) After charging the cell at a constant current at a cell's 3 C rate (that is, 3000 mA) and with a cut-off voltage of 3.8 V, a 10-second pause was provided. From this state, the cell was discharged at 3 C rate and with a cut-off voltage of 2.0 V, and a 10-second pause was provided.

(5) The cycle test of (4) was repeated 1,000 times.

(6) After performing the same charging as in (2), the same capacity confirmation as in (3) was performed.

(7) By dividing the discharge capacity in the capacity confirmation measured in (6) by the reference capacity before the cycle test to obtain a capacity retention after 1,000 cycles in terms of percentage (1,000 cycle capacity retention, unit: %).

Production Example 1: Production of Negative Electrode 100 parts by mass of artificial graphite as a negative electrode active material, 1.5 parts by mass of styrene-butadiene rubber as a binder, 1.5 parts by mass of carboxymethyl cellulose Na as a thickener, and water as a solvent were mixed, to thereby obtain a negative electrode composition having a solid content of 50% by mass.

The obtained negative electrode composition was applied onto both sides of a copper foil (thickness 8 μm) and vacuum dried at 100° C. Then, the resulting was pressure-pressed under a load of 2 kN to obtain a negative electrode sheet. The obtained negative electrode sheet was punched to obtain a negative electrode.

Examples B1 to B9

Examples B1 to B4 are implementation of the present invention, while Examples B5 to B9 are comparative examples.

A carbon-coated lithium iron phosphate (hereinbelow, also referred to as "carbon-coated active material") with an average particle size of 1.0 μm and a carbon content of 1% by mass was used as a positive electrode active material. The thickness of the coated section of the active material was in the range of 1 to 100 nm.

Carbon black was used as a conducting agent.

Polyvinylidene fluoride was used as a binder.

Example B1

First, a positive electrode current collector 11 was prepared by coating both the front and back surfaces of a positive electrode current collector main body 14 with current collector coating layers 15 by the following method. An aluminum foil (thickness 15 μm) was used as the positive electrode current collector main body 14.

A slurry was obtained by mixing 100 parts by mass of carbon black, 40 parts by mass of polyvinylidene fluoride as a binder, and N-methylpyrrolidone (NMP) as a solvent. The amount of NMP used was the amount required for applying the slurry.

The obtained slurry was applied to both sides of the positive electrode current collector main body 14 by a gravure method so as to allow the resulting current collector coating layers 15 after drying (total of layers on both sides) to have a thickness of 2 μm, and dried to remove the solvent, thereby obtaining a positive electrode current collector 11.

The current collector coating layers 15 on both surfaces were formed so as to have the same amount of coating and the same thickness.

Next, a positive electrode active material layer 12 was formed by the following method.

With the blending ratio shown in Table 3, the positive electrode active material, the conducting agent, the binder, and the solvent (NMP) were mixed with a mixer to obtain a positive electrode composition. The amount of the solvent used was the amount required for applying the positive electrode composition.

The positive electrode composition was applied on both sides of the positive electrode current collector 11, and after pre-drying, the applied composition was vacuum-dried at 120° C. to form positive electrode active material layers 12. The amount of the applied positive electrode composition is shown in Table 4 (the same applies to the other examples). The resulting laminate was pressure-pressed with a load of 10 kN to obtain a positive electrode sheet. Examples 1 to 9 in Tables 3 and 4 correspond to Examples B1 to B9.

In Table 4, the coating amount of the positive electrode composition and the thickness of the positive electrode active material layer are total values with respect to the positive electrode active material layers 12 on both sides of the positive electrode current collector 11. The positive electrode active material layers 12 on both surfaces of the positive electrode current collector 11 were formed so as to have the same coating amount and the same thickness.

Using the obtained positive electrode sheet as a sample, volume density and peel strength were measured. The folding endurance test (bent once and bent 5 times) was performed by the above method. The carbon content and compounding amount of the carbon-coated active material, the carbon content and compounding amount of the conducting agent, and compounding amount of the binder were used to calculate the conductive carbon content with respect to the positive electrode 1 excluding the positive electrode current collector main body 14, and the amount of binder with respect to the mass of the positive electrode active material layer. The conducting agent was regarded as having an impurity content of less than the quantification limit and a carbon content of 100% by mass. The conductive carbon content and the binder content can also be confirmed by the method described in the <<Method for measuring conductive carbon content>> above. The results are shown in Table 4 (the same applies to the other examples).

The obtained positive electrode sheet was punched to obtain a positive electrode.

A non-aqueous electrolyte secondary battery having a configuration shown in FIG. 2 was manufactured by the following method.

$LiPF_6$ as an electrolyte was dissolved at 1 mol/L in a solvent in which ethylene carbonate (EC) and diethyl carbonate (DEC) were mixed at a volume ratio, EC:DEC, of 3:7, to thereby prepare a non-aqueous electrolytic solution.

The positive electrode obtained in this example and the negative electrode obtained in Production Example 1 were alternately interleaved through a separator to prepare an electrode layered body with its outermost layer being the negative electrode. A polyolefin film (thickness 15 μm) was used as the separator.

In the step of producing the electrode layered body, the separator 2 and the positive electrode 1 were first stacked, and then the negative electrode 3 was stacked on the separator 2.

Terminal tabs were electrically connected to the exposed section 13 of the positive electrode current collector and the exposed section 33 of the negative electrode current collector in the electrode layered body, and the electrode layered body was put between aluminum laminate films while allowing the terminal tabs to protrude to the outside. Then, the resulting was laminate-processed and sealed at three sides.

To the resulting structure, a non-aqueous electrolytic solution was injected from one side left unsealed, and this one side was vacuum-sealed to manufacture a non-aqueous electrolyte secondary battery (laminate cell).

The volumetric energy density and impedance were measured by the above methods. In addition, the 90° bending cycle test was performed by the above method, and a 1,000 cycle capacity retention was measured. The results are shown in Table 4 (the same applies to the other examples).

Example B2

The load for the pressure-press was changed from that in Example B1 so as to give a volume density shown in Table 4.

Otherwise, a positive electrode was produced in the same manner as in Example B1, and a secondary battery was manufactured and evaluated in the same manner as in Example A1.

Examples B3 and B4

The blending ratio for the positive electrode composition was changed from that in Example B1 to that shown in Table 3. Further, the coating amount and the load for the pressure-press were adjusted so as to give the volume density shown in Table 4.

Otherwise, a positive electrode was produced in the same manner as in Example A1, and a secondary battery was manufactured and evaluated in the same manner as in Example B1.

Examples B5, B6, and B8

The load for the pressure-press was changed from that in Example B1 so as to give a volume density shown in Table 4.

Otherwise, a positive electrode was produced in the same manner as in Example A1, and a secondary battery was manufactured and evaluated in the same manner as in Example B1.

Examples B7 and B9

An aluminum foil (thickness 15 µm) having no current collector coating layer was used as the positive electrode current collector.

The positive electrode composition with the blending ratio shown in Table 3 was applied to both surfaces of the aluminum foil, and after pre-drying, and the applied composition was vacuum-dried at 120° C. to form positive electrode active material layers 12. The obtained laminate was pressure-pressed to obtain a positive electrode sheet. The coating amount and the load for the pressure-press were adjusted so as to give the volume density shown in Table 4. The obtained positive electrode sheet was punched to obtain a positive electrode.

Using the positive electrode obtained in this example, a secondary battery was manufactured and evaluated in the same manner as in Example B1.

TABLE 3

| | BLENDING AMOUNT OF POSITIVE ELECTRODE COMPOSITION (PARTS BY MASS) | | | |
|---|---|---|---|---|
| | POSITIVE ELECTRODE ACTIVE MATERIAL | CONDUCTING AGENT | BINDER | SOLVENT |
| Ex. 1 | 99.0 | 0.5 | 0.5 | NECESSARY AMOUNT |
| Ex. 2 | 99.0 | 0.5 | 0.5 | |
| Ex. 3 | 98.5 | 0.5 | 1.0 | |
| Ex. 4 | 99.5 | 0.0 | 0.5 | |
| Ex. 5 | 98.5 | 1.0 | 0.5 | |
| Ex. 6 | 98.5 | 1.0 | 0.5 | |
| Ex. 7 | 99.0 | 0.5 | 0.5 | |
| Ex. 8 | 92.0 | 7.0 | 1.0 | |
| Ex. 9 | 92.5 | 5.5 | 2.0 | |

TABLE 4

| UNIT | COATING AMOUNT OF POSITIVE ELECTRODE COMPOSITION (DOUBLE-SIDED TOTAL) mg/cm$^2$ | POSITIVE ELECTRODE ACTIVE MATERIAL LAYER | | | AMOUNT OF CONDUCTIVE CARBON/POSITIVE ELECTRODE EXCLUDING CURRENT COLLECTOR MAIN BODY % BY MASS | CURRENT COLLECTOR COATING LAYER | PEEL STRENGTH mN/cm |
|---|---|---|---|---|---|---|---|
| | | THICKNESS (DOUBLE-SIDED TOTAL) µm | VOLUME DENSITY g/cm$^3$ | AMOUNT OF BINDER % BY MASS | | | |
| Ex. 1 | 33.0 | 132 | 2.50 | 0.5 | 1.5 | PRESENT | 45.7 |
| Ex. 2 | 33.0 | 143 | 2.30 | 0.5 | 1.5 | PRESENT | 64.4 |
| Ex. 3 | 33.0 | 147 | 2.25 | 1.0 | 3.0 | PRESENT | 87.8 |
| Ex. 4 | 32.8 | 131 | 2.55 | 0.5 | 1.0 | PRESENT | 41.4 |
| Ex. 5 | 33.0 | 120 | 2.75 | 0.5 | 1.5 | PRESENT | 16.9 |
| Ex. 6 | 33.0 | 165 | 2.00 | 0.5 | 1.5 | PRESENT | 20.1 |
| Ex. 7 | 33.0 | 143 | 2.30 | 0.5 | 1.5 | ABSENT | 9.9 |

TABLE 4-continued

| | | | | | | | |
|---|---|---|---|---|---|---|---|
| Ex. 8 | 35.5 | 169 | 2.10 | 1.0 | 8.0 | PRESENT | 12.5 |
| Ex. 9 | 35.3 | 172 | 2.05 | 2.0 | 6.5 | ABSENT | 6.32 |

| UNIT | 90° FOLDING ENDURANCE TEST (ONCE) — | 90° FOLDING ENDURANCE TEST 5 TIMES — | VOLUMETRIC ENERGY DENSITY Wh/L | IMPEDANCE (1 kHz) mΩ | 90° BENDING 1000 CYCLE CAPACITY RETENTION (25 C. · 3 C. RATE) % |
|---|---|---|---|---|---|
| Ex. 1 | A | A | 283 | 7 | 87 |
| Ex. 2 | A | A | 274 | 8 | 84 |
| Ex. 3 | A | A | 263 | 7 | 82 |
| Ex. 4 | A | A | 289 | 6 | 89 |
| Ex. 5 | B | — | 293 | 6 | 61 |
| Ex. 6 | B | — | 258 | 13 | 38 |
| Ex. 7 | B | — | 276 | 142 | 6 |
| Ex. 8 | B | — | 232 | 7 | 62 |
| Ex. 9 | A | A | 239 | 22 | 43 |

As can be seen from the results shown in Table 4, in Examples B1 to B4 where the volume density was 2.2 to 2.7 g/cm$^3$ and the result of a 90° folding endurance test (1 time) was A (good), the peeling strength of the positive electrode active material layer was high, the volumetric energy density of the non-aqueous electrolyte secondary battery was high, and excellent characteristics were exhibited in the 90° bending cycle test. Impedance was also low.

In Examples B5 where the volume density was high, in the 90° folding endurance test, cracks were generated in the positive electrode active material layer, and the peel strength was also low.

In Example B6 where the volume density was low, the peel strength was low and the impedance was high. It is presumed that the contact between substances such as positive electrode active material, the conducting agent, and the positive electrode current collector that contribute to the conductivity is weak.

In Example 7 where the positive electrode current collector did not have the current collector coating layer, the peel strength was low and the impedance was very high.

In Example 8 where the amount of the conductive carbon was high and the volume density was low, the positive electrode active material layer was brittle and the peel strength was inferior since the volumetric energy density was low and the amount of the conducting agent was large.

In Example B9 where the positive electrode current collector did not have the current collector coating layer, the amounts of the conductive carbon and the binder were high, and the volume density was low, the volumetric energy density was low and the impedance was high.

REFERENCE SIGNS LIST

1 Positive electrode
2 Separator
3 Negative electrode
5 Outer casing
10 Secondary battery
11 Positive electrode current collector
12 Positive electrode active material layer
13 Exposed section of positive electrode current collector
14 Positive electrode current collector main body
15 Current collector coating layer
31 Negative electrode current collector
32 Negative electrode active material layer
33 Exposed section of negative electrode current collector
50 Double-sided tape
50a Adhesive layer
50b Release paper
51 Bending position
55 Adhesive body
60 Positive electrode sheet
70 Stainless steel plate
80 Mending tape

The invention claimed is:

1. A positive electrode for a non-aqueous electrolyte secondary battery, the positive electrode comprising:
   a positive electrode current collector comprising a positive electrode current collector main body formed of a metal material; and
   a positive electrode active material layer on the positive electrode current collector,
   wherein:
   the positive electrode active material layer comprises a positive electrode active material;
   the positive electrode active material comprises a compound having an olivine type crystal structure;
   a volume density of the positive electrode active material layer is 2.2 g/cm$^3$ to 2.7 g/cm$^3$; and
   the positive electrode suffers no damage when bent once in accordance with a 90° folding endurance test method specified in Japanese Industrial Standards (JIS) P 8115 (2001).

2. The positive electrode according to claim 1, wherein at least one of the positive electrode current collector or the positive electrode active material layer comprises a conductive carbon.

3. The positive electrode according to claim 2, wherein an amount of the conductive carbon is 0.5% by mass to 3.5% by mass with respect to a mass of the positive electrode excluding the positive electrode current collector main body.

4. The positive electrode according to claim 2, wherein the positive electrode active material has, on at least a part of a surface thereof, a coated section which comprises the conductive carbon and has a thickness of 1 nm to 100 nm.

5. The positive electrode according to claim 2, wherein the positive electrode current collector main body has, on at least a part of a surface thereof, a current collector coating layer which comprises the conductive carbon and has a thickness of 0.1 µm to 4.0 µm.

6. The positive electrode according to claim 1, wherein the positive electrode active material layer comprises a conducting agent.

7. The positive electrode according to claim 1, wherein the positive electrode active material layer does not contain a conducting agent.

8. The positive electrode according to claim 1, wherein the positive electrode suffers no damage when bent five times in accordance with the 90° folding endurance test method specified in JIS P 8115 (2001).

9. The positive electrode according to claim 1, wherein the positive electrode is produced by a roll-to-roll method.

10. A non-aqueous electrolyte secondary battery comprising:
the positive electrode according to claim 1;
a negative electrode; and
a non-aqueous electrolyte between the positive electrode and the negative electrode.

11. The non-aqueous electrolyte secondary battery according to claim 10, wherein the positive electrode and the negative electrode are wound together with a separator therebetween so as to define a wound electrode assembly.

12. A battery module comprising a plurality of the non-aqueous electrolyte secondary batteries according to claim 10.

13. A battery system comprising a plurality of the non-aqueous electrolyte secondary batteries according to claim 10.

* * * * *